US011059713B1

(12) United States Patent
Connor

(10) Patent No.: US 11,059,713 B1
(45) Date of Patent: Jul. 13, 2021

(54) REMOTE BEVERAGE SELECTION WITH A BEVERAGE DISPENSER

(71) Applicant: The Coca-Cola Company, Atlanta, GA (US)

(72) Inventor: Michael Connor, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 17/007,608

(22) Filed: Aug. 31, 2020

Related U.S. Application Data

(60) Provisional application No. 63/032,610, filed on May 30, 2020.

(51) Int. Cl.
*B67D 1/08* (2006.01)
*G06F 3/0481* (2013.01)
(Continued)

(52) U.S. Cl.
CPC ......... *B67D 1/0888* (2013.01); *G06F 3/0482* (2013.01); *G06F 3/04817* (2013.01); *G06F 9/541* (2013.01); *G06K 7/10722* (2013.01); *G06K 7/1417* (2013.01); *G06K 19/06037* (2013.01); *G06Q 20/18* (2013.01);
(Continued)

(58) Field of Classification Search
None
See application file for complete search history.

(56) References Cited

U.S. PATENT DOCUMENTS

| 7,578,415 B2 | 8/2009 | Ziesel et al. |
| 7,866,509 B2 | 1/2011 | Ziesel |

(Continued)

FOREIGN PATENT DOCUMENTS

| WO | 2015167846 | 11/2015 |
| WO | 2017146991 | 8/2017 |
| WO | 2020132457 | 6/2020 |

OTHER PUBLICATIONS

NPL, Youtube Video uploaded May 20, 2020 entitled "Sophia Touchless Solutions in Action" accessible online at https://www.youtube.com/watch?v=nt0zUIHaxeI&feature=emb_title (screen shots with time stamps provided).

(Continued)

*Primary Examiner* — Paul Danneman
(74) *Attorney, Agent, or Firm* — Meunier Carlin & Curfman LLC

(57) ABSTRACT

A beverage order fulfillment system allows for beverage fulfillment from a mobile device without requiring a custom software application on the mobile device but uses a web connection to control beverage dispenser operations instead. The mobile device incorporates web browser software, and the web browser software is configured to initiate communication sessions with the at least one server. Data entry options are displayed on the interactive GUI for the first computer to communicate beverage selection commands to the beverage dispensing software, via the at least one server, in a respective instance of beverage fulfillment. The at least one server incorporates web socket application program interfaces (APIs) stored on the at least one server and configured to connect a communications link to the beverage dispenser and the web browser software on the first computer.

20 Claims, 15 Drawing Sheets

(51) Int. Cl.
*G06Q 20/18* (2012.01)
*G06Q 30/06* (2012.01)
*G06Q 50/12* (2012.01)
*G06Q 20/32* (2012.01)
*G06Q 30/00* (2012.01)
*G06Q 20/20* (2012.01)
*G06F 9/54* (2006.01)
*H04L 9/32* (2006.01)
*G06K 19/06* (2006.01)
*G06K 7/14* (2006.01)
*G06K 7/10* (2006.01)
*G06F 3/0482* (2013.01)

(52) U.S. Cl.
CPC ....... *G06Q 20/202* (2013.01); *G06Q 20/3276* (2013.01); *G06Q 30/0185* (2013.01); *G06Q 30/0633* (2013.01); *G06Q 50/12* (2013.01); *H04L 9/3213* (2013.01); *H04L 9/3242* (2013.01); *H04L 9/3247* (2013.01); *G06Q 2220/00* (2013.01)

(56) References Cited

U.S. PATENT DOCUMENTS

| | | |
|---|---|---|
| 8,820,580 B2 | 9/2014 | Ziesel |
| 9,394,154 B2 | 7/2016 | Connerat et al. |
| 10,631,558 B2 | 4/2020 | White et al. |
| 2010/0326562 A1 | 12/2010 | Sheehy et al. |
| 2015/0039776 A1 | 2/2015 | Jarnagin, III |
| 2015/0082243 A1 | 3/2015 | Taylor et al. |
| 2015/0178721 A1* | 6/2015 | Pandiarajan ..... G06K 19/06037 705/75 |
| 2016/0325980 A1 | 11/2016 | Sawhney et al. |
| 2017/0081163 A1 | 3/2017 | Gatipon et al. |
| 2017/0099981 A1* | 4/2017 | Haidar ................. G07F 13/10 |
| 2018/0288594 A1 | 10/2018 | Kim |
| 2019/0308866 A1 | 10/2019 | Sawhney et al. |
| 2020/0031656 A1 | 1/2020 | Rudick et al. |

OTHER PUBLICATIONS

NPL, Youtube Video uploaded Jun. 12, 2020 entitled "Bevi Touchless Dispensing" accessible online at https://www.youtube.com/watch?v=neYVEklylEw (screen shots with time stamps provided).

* cited by examiner

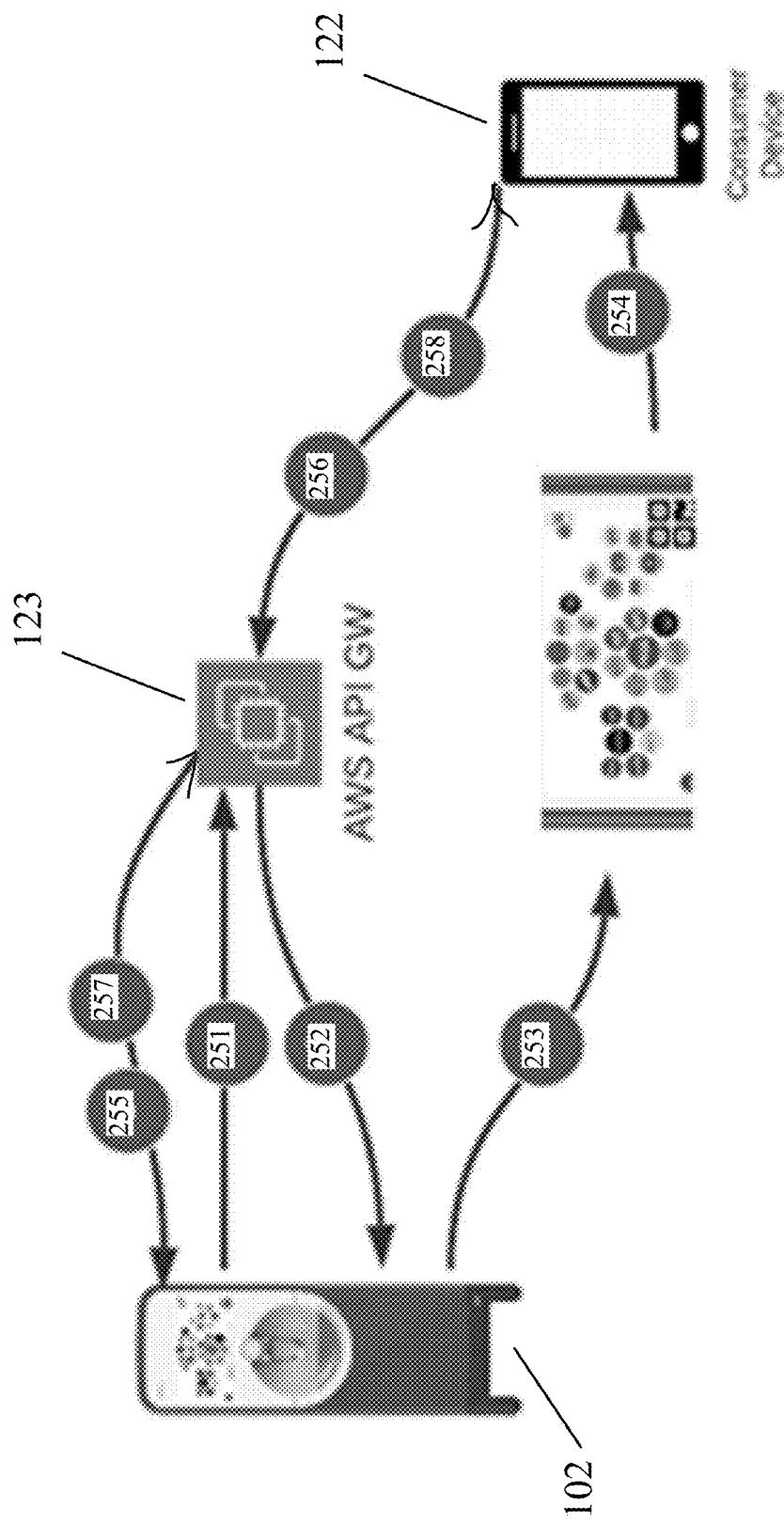

REMOTE BEVERAGE SELECTION WITH A BEVERAGE DISPENSER

CROSS-REFERENCE TO RELATED APPLICATIONS

This application claims priority to and incorporates entirely by reference U.S. Provisional Patent Application Ser. No. 63/032,610 filed on May 30, 2020 and entitled Remote Beverage Selection with a Beverage Dispenser.

BACKGROUND

Traditional post-mix beverage dispensing systems generally mix streams of syrup, concentrate, sweetener, bonus flavors, other types of flavorings, and/or other ingredients with water or other types of diluents by flowing the syrup stream down the center of the nozzle with the water stream flowing around the outside. The syrup stream is directed downward with the water stream such that the streams mix as they fall into a consumer's cup. There is a desire for a beverage dispensing system as a whole to provide as many different types and flavors of beverages as may be possible in a footprint that may be as small as possible. Recent improvements in beverage dispensing technology have focused on the use of micro-ingredients. With micro-ingredients, the traditional beverage bases may be separated into their constituent parts at much higher dilution or reconstitution ratios.

This technology is enabled via cartridges containing the highly concentrated micro-ingredients. The micro-ingredients are mixed with sweeteners and still or sparkling water using precise metering and dosing technologies and dispensed through a nozzle that promotes in-air mixing so as to prevent carry-over. The technology includes a user input for a user to select a desired beverage, customize the beverage if desired, and pour the beverage at the dispenser. These beverages are made from precise recipes to ensure a great tasting beverage regardless of the customization.

Post-mix beverage dispensing systems using micro-ingredients greatly increase a number of beverage options available at a given dispenser. For example, a personalized interaction with the beverage dispenser may take place as described in U.S. 2015/0082243, filed Sep. 15, 2014, entitled "Product Categorization User Interface for a Dispensing Device", hereby incorporated by reference in its entirety.

Because a number of users may establish a line or sequence of users (i.e., a queue) awaiting their turn to interact with a beverage dispenser, a queuing problem may come about whereby it is difficult to determine which consumer is addressing the beverage dispenser at a given time and wishes to establish an interaction with the beverage dispenser. The queueing problem is particularly pronounced when the handshake between the dispenser and the consumer's mobile computing device is performed via wireless communication technologies whose range may encompass multiple consumer mobile computing devices. The queuing problem may be further exacerbated when there are multiple beverage dispensers within wireless communication range.

Prior solutions to the queueing problem have focused on deterministic methods of ascertaining which consumer is addressing a particular beverage dispenser at a given time. For example, a consumer may use their mobile computing device to scan an identifier of the beverage dispenser upon addressing the beverage dispenser, as described in U.S. 2015/0039776, filed Feb. 5, 2015, entitled "Facilitating Individualized User Interaction with an Electronic Device," hereby incorporated by reference in its entirety. Similarly, for a wireless handshake between the beverage dispenser and the consumer's mobile computing device, a range of a wireless beacon that transmits the identifier of the beverage dispenser is limited (e.g., within 1-12 inches of the beverage dispenser) to restrict the possibility of multiple mobile computing devices in the queue or adjacent queues from receiving the signal, as described in U.S. 2018/0288594, filed Sep. 27, 2016, entitled "Dispenser Connectivity", hereby incorporated by reference in its entirety.

Another development in beverage fulfillment has allowed consumers to use personal computer device applications (i.e., "mobile apps") to interact with beverage dispensers. One example implementation of beverage dispensers controlled by mobile apps is discussed in detail in commonly owned international patent application PCT/US2019/067875 filed on Dec. 20, 2019, and incorporated by reference herein. As discussed therein, upon a mobile application installed on a consumer's mobile device reporting to a server that a first dispenser identifier, such as a scanned QR code, has been received from an area, the server may supply data regarding available beverages. For example, the server may supply the consumer's profile to all the beverage dispensers within a particular outlet or all beverage dispensers within a predetermined distance of the consumer's mobile device. In this non-limiting optional embodiment, the beverage dispensers each maintain a database of regional profiles—profiles of consumers within a given region (e.g., outlet or predetermined distance). Likewise, upon the mobile application no longer receiving the first dispenser identifier within a threshold time period or otherwise leaving the region, the consumer's profile is removed from a database of regional profiles.

Even with so many developments in beverage fulfillment using mobile devices, consumers remain hindered by technical hurdles that require modifications to current beverage systems. Today's customer base for beverages utilizes self-serve beverage dispensers at multiple establishments, in diverse locations, and often "on-the-fly," with impulse purchase decisions occurring in real time. Accordingly, some customers may not be inclined to download necessary software and mobile apps, especially if each vending location requires a particular piece of software. A need continues to exist, therefore, in the field of beverage fulfillment for an easier system to use self-serve beverage dispensers with maximum flexibility for the consumer.

SUMMARY

In one embodiment, a computerized system of beverage order fulfillment may be described as a system in which a first computer is connected in bi-directional electronic communication with at least one server over a network. A beverage dispenser having a processor and computerized memory storing beverage dispensing software thereon is in electronic communication with the at least one server over the network. The first computer incorporates web browser software stored on the first computer, and the web browser software is configured to initiate communication sessions with the at least one server. An interactive graphical user interface (GUI) may be displayed on the first computer via the web browser, and the interactive GUI is configured and updated by communications from the at least one server. Data entry options are displayed on the interactive GUI for the first computer to communicate beverage selection commands to the beverage dispensing software, via the at least one server, in a respective instance of beverage fulfillment. The at least one server incorporates web socket application program interfaces (APIs) stored on the at least one server and configured to connect a communications link to the beverage dispenser and the web browser software on the first computer. These and other features will be more clearly understood from the following detailed description taken in conjunction with the accompanying drawings and claims.

In another embodiment, a computer implemented method of beverage fulfillment includes establishing an instance of beverage fulfillment with electronic communications between a mobile device and a beverage dispenser, via a web server, by using respective computers. A first computer may be a mobile device that scans a QR code displayed on the beverage dispenser to initiate the electronic communications among the mobile device, the web server, and the beverage dispenser. The first computer, or mobile device, connects to a web address at the web server, wherein the web address is embedded within the QR code. The method continues by receiving at the mobile device, from the web server, an interactive graphical user interface (GUI) corresponding to beverage options available at the beverage dispenser and using the interactive graphical user interface to transmit beverage commands to the web address. The web server to implement the beverage commands with beverage dispensing software stored on the beverage dispenser.

In another embodiment, a beverage dispenser may include a beverage dispenser display connected to a computer processor and computerized memory storing beverage dispensing software. The beverage dispenser includes a nozzle configured to dispense a selected beverage and a plurality of pumping and/or metering devices, each configured to supply beverage ingredients for the selected beverage from an ingredient source to the nozzle according to commands executed in the beverage dispensing software. A communications device configured to connect the beverage dispenser to a web server on a network and to receive beverage selection commands from the web server.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2B illustrates an overview schematic of a communications system enabling a mobile device to control a beverage dispenser according to the disclosure herein.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A", "B", and/or "C" means "A", or "B", or "C", or "A and B", or "A and C", "B and C" or "A and B and C".

A beverage dispenser 102 may have one or more wireless communication devices associated with the dispenser, giving the beverage dispenser added functionality for multiple embodiments of this disclosure. For example, each may be configured to broadcast one or more dispenser identifiers of the beverage dispenser to remote devices if such technology is helpful to validate secure communications with customer devices, servers, or other computers in a retail establishment. For example, a dispenser identifier may be an identifier common to a plurality of beverage dispensers or all compatible beverage dispensers. Another dispenser identifier may uniquely identify a particular beverage dispenser.

In some implementations, specialized configurations are possible when beverage dispensers are "smart dispensers" with multiple communications capabilities. For example, the beverage dispenser 102 may include a plurality of wireless communication devices that each broadcast a dispenser identifier and connect to various remote computers at a different communication range. For example, the first wireless communication device may be a WiFi modem 112 with a communication range of around 100-300 feet. A second wireless communication device may broadcast a second dispenser identifier at a second range from the beverage dispenser. For example, the second wireless communication device may be a Bluetooth beacon with a communication range of around 10-20 feet.

Figure 1:
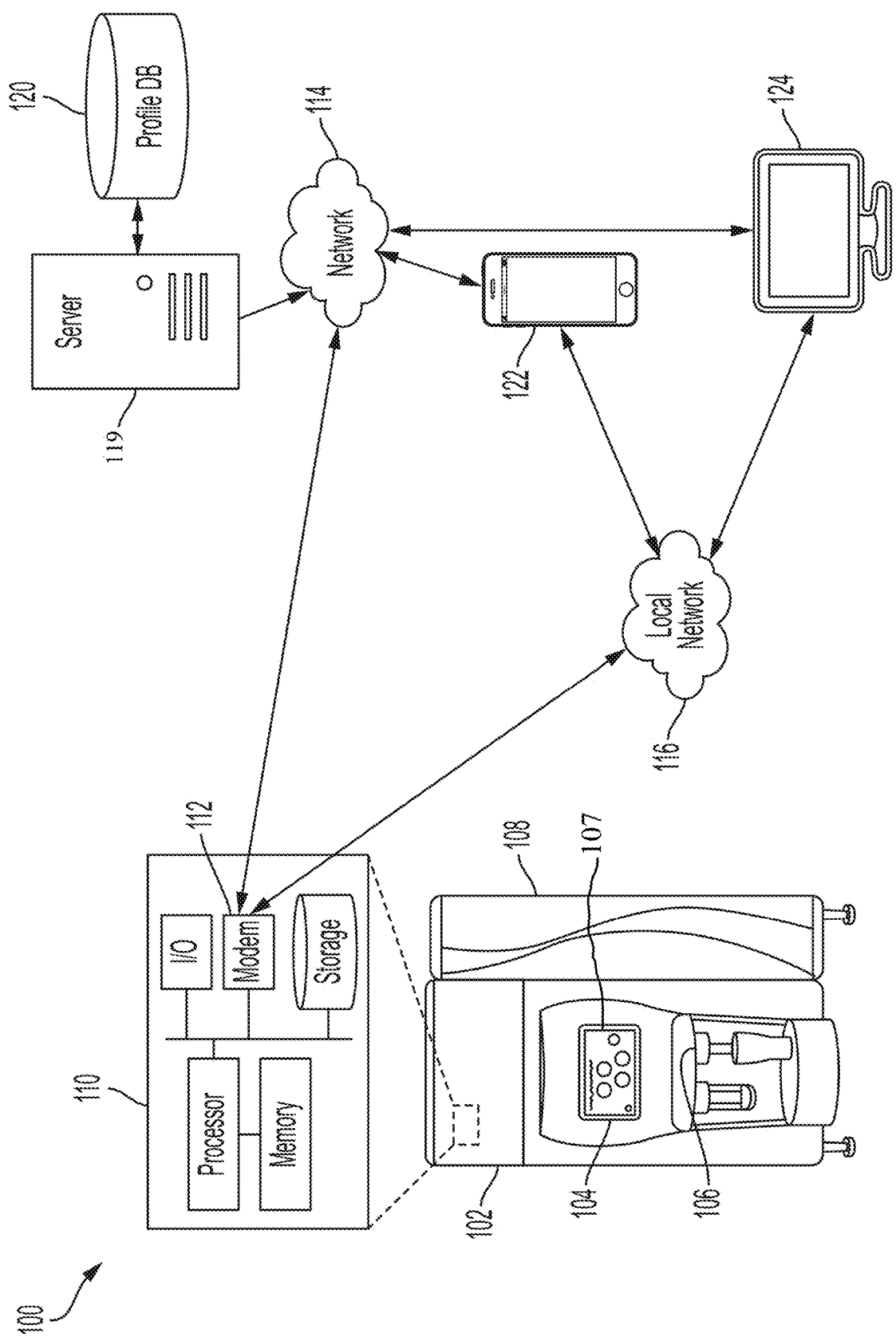
FIG. 1 illustrates an exemplary system block diagram for pre-loading a selection of a beverage on a beverage dispenser according to various embodiments of the disclosure.

As a general overview, FIG. 1 illustrates an exemplary system 100 for pre-loading a selection of beverages on a beverage dispenser 102 according to various embodiments of the disclosure. The beverage dispenser 102 includes a user interface 104, such as a display 107 for selecting a desired beverage to be poured from a nozzle 106 on the beverage dispenser 102. In some implementations, the beverage dispenser 102 includes an ingredient compartment 108 for storing a plurality of beverage ingredients, such as beverage micro-ingredients. One or more additional beverage ingredients (not shown) may be supplied to the beverage dispenser 102 from a remote location, such as a back room. The additional beverage ingredients may comprise a sweetener, flavored syrup, carbon dioxide, water, carbonated water, and/or other beverage ingredients. A pump and/or metering device (e.g., positive displacement pump, static mechanical flow control valve, dynamic mechanical flow control valve, shut-off valve, etc.) is coupled between each of the beverage ingredients and the nozzle 106 for controlling an amount, rate, or ratio of beverage ingredients dispensed for dispensing a selected beverage, as described in more detail below.

The beverage dispenser 102 may include a control architecture 110 having a modem 112 for communicating with external devices. While shown as a single component, the modem 112 may be a plurality of modems for communicating with different communication standards. For example, the modem 112 may have an ethernet card and/or a cellular modem for connecting (e.g., via a local gateway, not shown) to a wide area network (WAN) 114, such as the internet. The modem 112 may additionally include a local wireless communications modem for supporting communication over a local network 116 using one or more local wireless communication standards, such as WiFi, WiFi Direct, Zigbee, Z-Wave, Bluetooth, or Bluetooth Low Energy (BLE) communications. In addition to the modem 112, the beverage dispenser 102 may emit a beacon (not shown), such as a BLE beacon for broadcasting a unique identifier associated with the beverage dispenser 102. These modern features enable multiple programming and updating techniques with state of the art telecommunications processes.

The beverage dispenser 102 may be configured to utilize the modem 112 for communicating 118 over the wide area network, WAN 114, with a remote server 119. In some embodiments, the beverage dispenser 102 is also configured to receive one or more notifications from the server 118 regarding how to handle communications with a consumer mobile device 122 intending to utilize the beverage dispenser 102. The mobile device 122 may be a smartphone, smartwatch, personal digital assistant, or any other mobile computing device carried by a consumer. The beverage dispenser 102 is also configured to utilize the modem 112 to communicate locally with the consumer mobile device 122 or a local point-of-sale (POS) device 124.

In some non-limiting embodiments, a POS device 124 may be located in the same outlet (e.g., restaurant, convenience store, etc.) as a beverage dispenser 102. For example, the POS device 124 may be a self-service order entry system for receiving consumer orders at the outlet. The POS device 124 facilitates consumers to select a desired food order on the POS device 124 when placing an order, prior to a consumer utilizing a beverage dispenser 102. The POS device 124 may or may not be in communication with the beverage dispenser 102 via the local network 116, such as via a wired or wireless communication.

In some implementations, a separate POS device 124 may be in communication with each beverage dispenser 102 in a given outlet to facilitate beverage fulfillment. In some implementations, a POS device 124 may be associated with more than one beverage dispenser 102.

In one embodiment of this disclosure, the mobile device 122 avoids requiring a consumer to download a mobile application and yet remains compatible with facilitating personalized interactions with the beverage dispenser 102. Embodiments of this disclosure enable using a mobile device 122 with an ordinary internet connection (instead of a specialized mobile app) to order a favorite beverage(s), browse options for mixed or blended beverages, and maintain access to updated or future beverage choices that are available at one of the above noted beverage dispensers 102.

In general, the mobile device 122 and the beverage dispenser 102 are configured for bi-directional online communication through a web server, as discussed below. Upon the mobile device being located in sufficient proximity of the beverage dispenser 102 to scan, photograph, or process an image, such as a QR code 155, shown on the beverage dispenser display 107, a communications link 118 will be facilitated online via the web server 119. Of course, this disclosure is also broad enough for use with other technologies related to beverage dispensers that are not the main focus of this disclosure (e.g., the mobile device 122 and the beverage dispenser may connect via a web server when the mobile device 122 is within a first range of the beverage dispenser 102 or within an outlet in which the beverage dispenser 102 is located if scanning a QR code is not the most efficient means of connection).

FIGS. 2-5 illustrate exemplary diagrams for communication sessions 200 between the mobile device 122 and the beverage dispenser 102 according to various embodiments of this disclosure. In the implementations shown and without limiting this disclosure, the beverage dispenser 102 may include communications resources such as, but not limited to, a first wireless communication device and a second wireless communication device configured to broadcast data for wireless communications with internet networks, other computers, and/or the mobile devices 122.

Figure 2A:
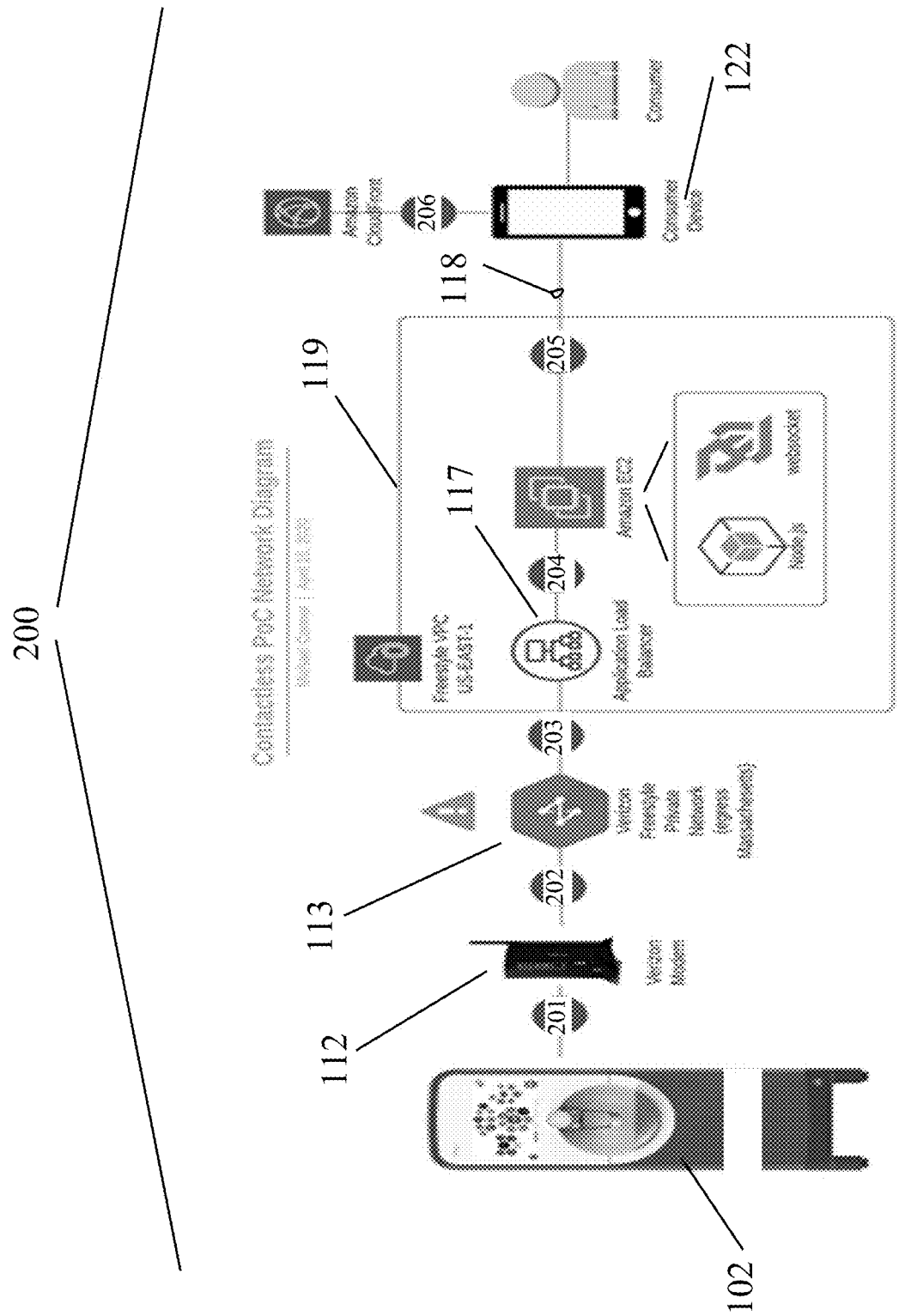
FIG. 2A illustrates an overview schematic of a communications system enabling a mobile device to control a beverage dispenser according to the disclosure herein.

Considering FIG. 2A, the schematic diagram illustrates how a mobile device 122 may implement a communications link 118 via a web server 119 to a beverage dispenser 102 for completing an entire instance of beverage fulfillment operations. Without limiting this disclosure, an instance of beverage fulfillment includes all of the steps, communications, and beverage dispenser operations by which a consumer selects, completes, and can receive a beverage in a cup that is ready for consumption. The steps of the schematic of FIG. 2A illustrate that at step 201, the beverage dispenser 102 utilizes a communications device, such as a modem 112, to connect to a network 113 offering internet connections to a web server 119. In one embodiment, at step 202, vendors of beverages that are dispensed through the beverage dispenser 102 may utilize a private network, providing specialized and secure connections to particular devices via known internet service providers, to connect thousands of beverage dispensers, dispersed across various geographic regions, to servers, computers, and peripheral equipment described below. At step 203, after communications data from a beverage dispenser connection leaves its private network 113 for communication with consumer operated mobile devices 122 on public communications networks, a beverage dispenser connection may connect to load balancing equipment 117 and gateway hardware 116 for managing secure communications between mobile devices 122 and a network of beverage dispensers. As illustrated in step 204, network traffic flows through a load balancer 117 to implement web communications and data processing operations, such as, but not limited to services provided, at least in part, by Amazon Web Servers (AWS). In some embodiments, traffic egresses the AWS and into a public internet service provider network, (e.g., step 205), for communications on global communications networks serving mobile devices operated by beverage consumers. At the retailer, a consumer uses a mobile device 122 to select beverage fulfillment commands that are transmitted across the above-described network to complete an instance of beverage fulfillment at a beverage dispenser 102. Step 206 illustrates optional connections, such as those provided in cloud service providers, for caching transaction data at a network edge.

FIG. 2B illustrates another version of completing an instance of beverage fulfillment. First, the beverage dispenser 102 establishes a communications connection 251 to an application program interface ("API") via a gateway ("GW") initiating an appropriate web socket protocol (e.g. AWS) and in one embodiment, passes a serial number of the dispenser 102 to the web server. At step 252, the API gateway server distributes a security token to the beverage dispenser 102, upon connecting to the beverage dispenser 102, and sends another every ten seconds. At step 253, the beverage dispenser 102 displays, on a graphical user interface 104, a barcode 155 that includes an encrypted URL and at communications connection 251, the beverage dispenser 102 sends that barcode 155 to the API gateway server 123 along with the previously received security token, which is updated every 10 seconds. At step 254, a customer scans the 2D barcode (i.e., the QR code 155), approves launching a web browser on the mobile device 122, and opens a mobile version of a website on the mobile device 122. The browser on the mobile device 122 connects to the API gateway web socket at 256 and receives the validation token at step 258 in bidirectional communication between the mobile device 122 and the API gateway server 123. Beverage fulfillment occurs via this connection. At step 255, the API gateway server 123 sends the beverage dispenser 102 notice that a mobile device 122 is connected. The dispenser updates the 2D barcode to indicate that the consumer is connected. In step 256, the consumer uses graphical user interface selection options displayed on the mobile device 122, received from the API gateway server 123, to select a beverage and presses a pour icon, an ice icon, or a stop icon, among other selections in various embodiments. In some embodiments, the selections may include mixing beverage selections at desired proportions in a single cup. At step 257, the API gateway relays the pour events from the mobile devices to the dispenser. At 258, the consumer clicks done on the mobile device user interface, there is a timeout, or there is another activity requiring termination of beverage fulfillment.

Figure 2C:
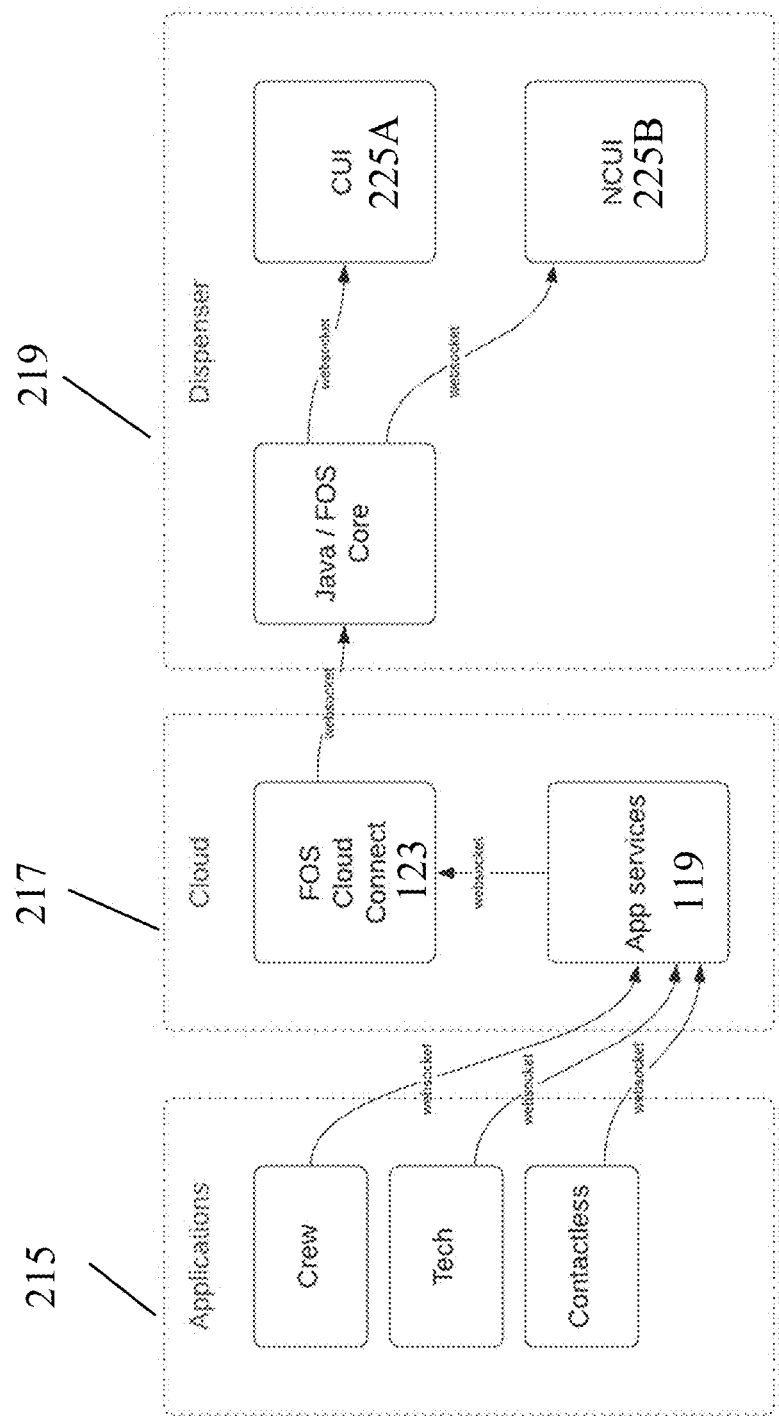
FIG. 2C illustrates an overview schematic of a communications system enabling a mobile device to control a beverage dispenser according to the disclosure herein.

FIG. 2C illustrates an overview schematic of the above described operations. This figure essentially lays out the process in an applications layer 215 accessed via a gateway server 123, which may initiate cloud based operations 217 with the electronics configured within a beverage dispenser 219. The API gateway server 123 may implement different application interfaces 215 depending on the kind of user communicating to the web server 119 via the API gateway server 123. In this regard, the beverage dispenser 102 may be configured for secure communications via a customer user interface 225A and/or a non-customer user interface 225B, each having distinct web socket connections and authorizations. In this way, the web server 119 can provide access to appropriate data and communications resources depending on whether the user is a member of a beverage manufacturer crew (with specialized access), a beverage dispenser technician (e.g., with maintenance access) or a user with contactless access for beverage purchases as described herein. Appropriate application services with distinct web socket connections are provided to each in the cloud operations 217 available in at least one embodiment.

Figure 3:
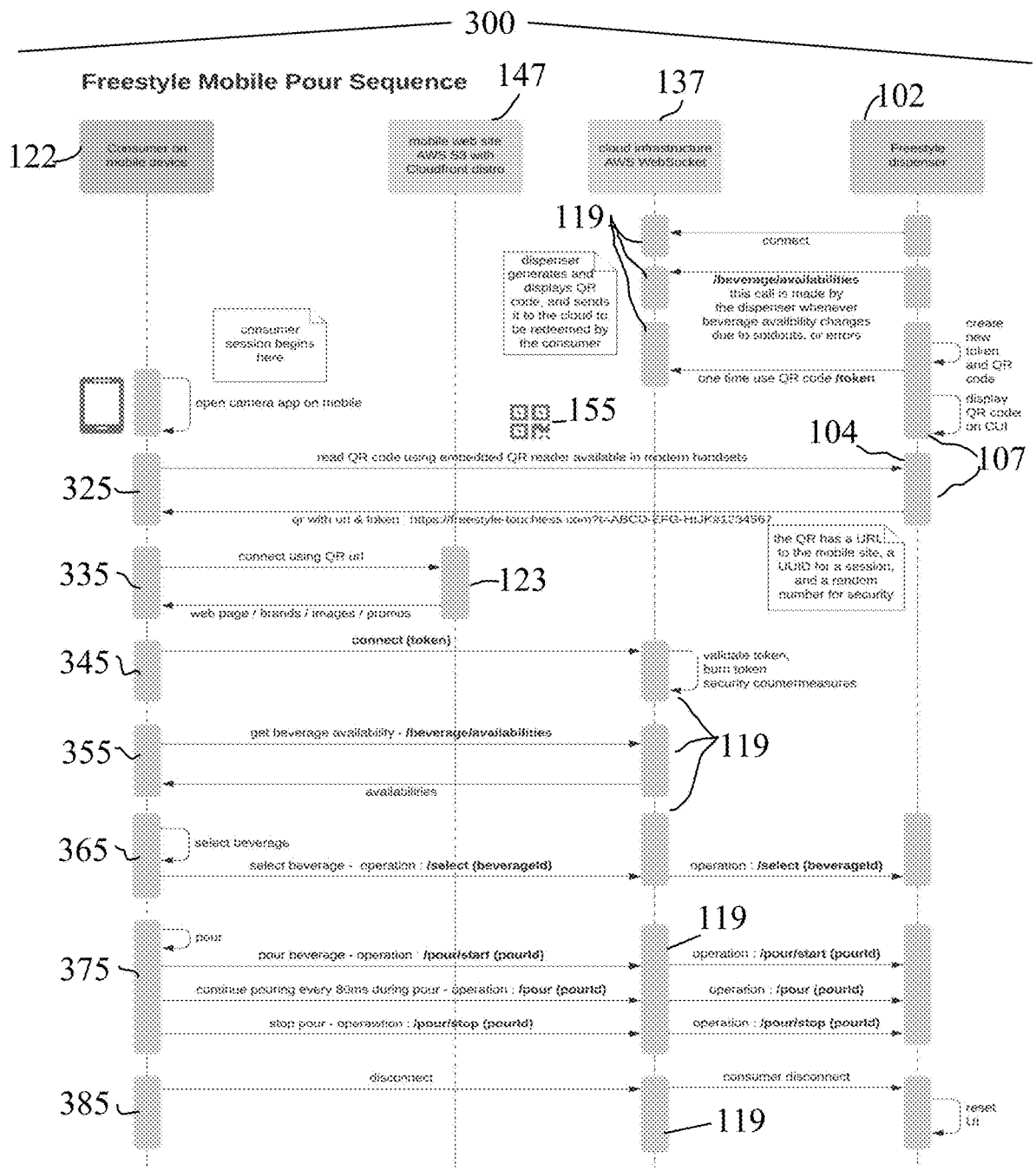
FIG. 3 illustrates a data sequence by which a mobile device controls a beverage dispenser via a web server according to embodiments of this disclosure.

FIG. 3 illustrates an exemplary entity sequence diagram 300 for an indirect communication session between the mobile device 122, the web server 119, and the beverage dispenser 102 according to various embodiments of the disclosure. The sequence diagram 300 shows the server 119 serving as an intermediary to facilitate a communications link 118 between the mobile device 122 and the beverage dispenser 102. Steps of the sequence include but are not limited to:

At 325, a QR code 155 may be displayed on the beverage dispenser 102 graphical user interface 104 for reading by a mobile device 122 with an indication that it can be used by mobile phones for a contactless experience. As shown at 325, consumers, therefore, are able to scan the QR code 155 with their mobile camera and activate the experience via web server 119 without installing a mobile app. The mobile phone, or mobile device 122, will prompt the user to make sure they want to open the contactless experience. In some embodiments the mobile experience may open in under three seconds on an LTE smart phone with good signal reception. The QR code 155 will have an embedded security token so that only someone in front of a beverage dispenser 102 can activate the experience. Once the consumer has opened the mobile experience 147, they will be connected to the beverage dispenser 102 via a cloud infrastructure web socket 137. This will have all of the qualities of a direct connection from the perspective of the consumer but with security controlled by a web server 119 there between.

As noted in FIG. 3, the beverage dispenser 102 is continuously updating its connection with the cloud infrastructure and associated web sockets 137. The cloud based web server 119 receives updated QR codes and associated tokens via periodic security updates between the web server 119 and the beverage dispenser 102. The updated QR codes are shown in a display 107 associated with a graphical user interface 104 on the beverage dispenser. At steps 345, 355, the mobile device 102 receives updates to its mobile website connection to web server 119 for proper display of beverage availability and other updates relate to using the beverage dispenser. These communications with web server 119 are secured by previously received communications token described at step 325 and discussed below in more detail.

In FIG. 3, at 365, once the consumer is connected to the beverage dispenser 102, the QR code 155 shown on the beverage dispenser customer user interface ("CUI") 225A will change to reflect the fact that a connection has been made. In one non-limiting embodiment, a QR code 155 with a mobile phone icon on top of it may be shown to indicate a busy operation is underway. This will also effectively prevent another consumer from scanning the code. From the mobile device 122, consumers should be able to select a beverage. This selection should also reflect sold out options because the beverage dispenser may transmit inventory data to the web server 119. The customer user interface 225A should reflect the choices being made by the consumer. This is a good feedback mechanism, but also makes it possible for the consumer to resume their experience using touch if they are accidentally disconnected. Technician and crew settings, established via respective non-customer user interfaces 225B may enable consumers to complete a volume pour based on prior inputs and settings from a non-customer user interface 225B, or retail establishment crew settings. Consumers should be able to cancel the pour. Consumers may be able to do a hold-to-pour operation in some. These operations are summarized in FIG. 3 at 375, 385.

In touch to pour embodiments, if the consumer loses connectivity to the beverage dispenser 102, the instance of beverage fulfillment should cancel the pour after a selected number of milliseconds. This time period may be variable based on tested latency of the web connection among mobile devices, web servers, and beverage dispensers.

Once the consumer is done with their pour, they should be able to execute a "top-off" from the screen selections on their mobile device.

Once the consumer is completely finished with their experience, they should be able to click "Done". This would return the dispenser and the 2D bar code to its original state.

If anyone touches the dispenser CUI while the mobile experience is in play, the mobile experience would be terminated.

If the mobile phone loses connectivity for X seconds, or the user does not continue with the experience for Y seconds, then the CUI would return to its original state.

In one embodiment, a computerized system 200 of beverage order fulfillment may be described as a system in which a first computer 122 is connected in bi-directional electronic communication with at least one web server 119 over a network via a gateway server 123. A beverage dispenser 102 having a processor and computerized memory storing beverage dispensing software thereon is in electronic communication with the at least one server over the network. The first computer incorporates web browser software stored on the first computer, and the web browser software is configured to initiate communication sessions with the at least one server 119. An interactive graphical user interface (GUI) 600 may be displayed on the first computer 122 via the web browser, and the interactive GUI 600 is configured and updated by communications from the at least one server 119. Data entry options are displayed on the interactive GUI for the first computer to communicate beverage selection commands to the beverage dispensing software, via the at least one server, in a respective instance of beverage fulfillment. The at least one server incorporates web socket 116 application program interfaces (APIs) stored on the at least one server and configured to connect a communications link 113 to the beverage dispenser 102 and the web browser software on the first computer.

Encryption programs stored on the computerized memory of the beverage dispenser. The encryption programs are configured to create validation tokens for the respective instances of beverage fulfillment 215-217 as shown in FIG. 2C, the validation tokens confirming authenticity of electronic communications among the first computer, at least one server, and the beverage dispenser. The encryption programs are further configured to incorporate the validation tokens into a QR code displayed on the beverage dispenser via a beverage dispenser display, wherein the beverage dispenser communicates the token encoded by the QR code to the at least one server for use in the respective instance of beverage fulfillment. When an instance of beverage fulfillment is underway, a busy icon is displayed on the beverage dispenser display during the respective instance of beverage fulfillment.

The beverage dispenser further includes a customer user interface and a non-customer user interface connecting the beverage dispenser display to the processor and the computerized memory of the beverage dispenser. The non-customer user interface may include specialized screens by which employees at a retail establishment can program functionality or limits to functionality to the beverage dispenser. The first computer may be a mobile device further comprising a camera and configured to initiate the web browser software and present the beverage selection experience upon the camera processing a QR coded image displayed on the beverage dispenser. The image is a QR code that may incorporate a validation token and a web address that initiates a website on the mobile device corresponding to the beverage fulfillment software on the beverage dispenser.

As discussed above, FIG. 3 illustrates that embodiments of this disclosure may also be described as a computer implemented method of beverage fulfillment, and the method includes the steps of establishing an instance of beverage fulfillment 300 with electronic communications between a mobile device 122 and a beverage dispenser 102, via a web server 119, by using respective computers to perform the optional steps 325-385 of beverage fulfillment. For example, at 325, using the mobile device 122, a consumer may initiate beverage fulfillment at a beverage dispenser by scanning a QR code 155 displayed on the beverage dispenser 102 to initiate the electronic communications among the mobile device 122, the web server 119, and the beverage dispenser 102. The telecommunications networks 113, 123 accessible by the mobile device may connect the mobile device to a web address at the web server 119, wherein the web address is embedded within the QR code. With the web server as an intermediary between the mobile device and the beverage dispenser, the mobile device may receive, from the web server, an interactive graphical user interface (GUI) 600 corresponding to beverage options available at the beverage dispenser. At 345-375, the method of this embodiment uses the interactive graphical user interface 600 to transmit beverage commands to the web address. Using the web server to implement instance of beverage fulfillment, the beverage commands control the equipment described below with beverage dispensing software stored on the beverage dispenser.

At the beverage dispenser, the method includes the steps of using the beverage dispensing software to create the QR code and a unique validation token that proves authenticity of information used during the instance of beverage fulfillment. The beverage dispensing software at the beverage dispenser embeds the unique validation token and the website address in the QR code and furthermore transmits and stores the QR code, with the unique validation token and the website address embedded therein, at the web server. Simultaneously, the beverage dispenser displays the QR code, with the unique validation token and the website address embedded therein, at the beverage dispenser.

From the consumer perspective, using a camera on the mobile device, the consumer processes an image of the QR code displayed at the beverage dispenser and initiates an instance of beverage fulfillment with the QR code by connecting the mobile device to the website address embedded within the QR code. It is significant that this connection does not require a mobile app on the mobile device because beverage fulfillment of this disclosure can be completed by a simple website connection on the internet.

The consumer uses the mobile device to extract the unique validation token embedded within the QR code and transmits an extracted validation token from the mobile device back to the web server. The web server then compares the extracted validation token to the unique validation token to validate the electronic communications between the mobile device and the beverage dispenser. The web server verifies the authenticity of the token through a digital signature via, for example, HMAC hash-based message authentication code using a shared secret.

The graphical user interface at the mobile device transmits beverage commands, which in non-limiting embodiments, may include selecting a beverage available at the beverage dispenser, pouring the beverage from the beverage dispenser, and stopping the pouring of the beverage.

As used herein, and by example only, a beverage dispenser used in embodiments of this disclosure includes a beverage dispenser display connected to a computer processor and computerized memory storing beverage dispensing software, a nozzle configured to dispense a selected beverage, a plurality of pumping and/or metering devices, each configured to supply beverage ingredients for the selected beverage from an ingredient source to the nozzle according to commands executed in the beverage dispensing software, and a communications device configured to connect the beverage dispenser to a web server on a network and to receive beverage selection commands from the web server. The beverage dispenser, as noted above, includes encryption programs stored on the computerized memory of the beverage dispenser. The encryption programs are configured to create validation tokens for respective instances of beverage fulfillment, the validation tokens confirming authenticity of electronic communications and beverage selection commands from the web server. The encryption programs are further configured to incorporate the validation tokens into a QR code displayed on the beverage dispenser via a beverage dispenser display, wherein the beverage dispenser communicates the token and the QR code to the at least one server for use in the respective instance of beverage fulfillment.

As shown in FIGS. 2 and 3, a computerized system of beverage order fulfillment may include a first computer, including but not limited to mobile device 122, connected in bi-directional electronic communication with at least one web server 119 over a network 118. A beverage dispenser 102 is a smart device connected to networks and utilizes hardware, such as a processor and computerized memory storing beverage dispensing software thereon. The beverage dispenser 102 is also in electronic communication with the at least one server 119 over the network 118. Web browser software is stored on the first computer which is often a mobile device 122 or smart phone, and the web browser software on the mobile device 122 is configured to initiate communication sessions with the at least one server 119. The first computer, such as the mobile device 122 includes an interactive graphical user interface (GUI) including a display on the first computer for interacting with the web browser. The interactive GUI has been configured and updated by communications from the at least one server, and data entry options are displayed on the interactive GUI for the first computer/mobile device 122 to communicate beverage selection commands to the beverage dispensing software on the beverage dispenser 102, via the at least one server 119, in a respective instance of beverage fulfillment.

As shown in FIG. 3, the computerized system further includes web socket application program interfaces (APIs) stored on the at least one server 119 and accessible via a gateway server 123 and configured to connect to the beverage dispenser 102 and the web browser software on the first computer/mobile device 122. These communications are secured via encryption programs stored on the computerized memory of the beverage dispenser. The encryption programs are configured to create validation tokens for the respective instances of beverage fulfillment, the validation tokens confirming authenticity of electronic communications among the first computer/mobile device 102, at least one server 119, and the beverage dispenser 102. The encryption programs are further configured to incorporate the validation tokens into a QR code 155 displayed on the beverage dispenser 102 via a beverage dispenser display 104, 107, wherein the beverage dispenser communicates the token encoded by the QR code 155 to the at least one server 119 for use in the respective instance of beverage fulfillment. In one embodiment, the beverage dispenser 102 is equipped to display various images including beverage selections and a QR code The QR code may include an encryption validation token and a web address that initiates a website on the mobile device corresponding to the beverage fulfillment software on the beverage dispenser 102. The first computer, therefore, may be characterized as a mobile device further comprising a camera and configured to initiate the web browser software and present the beverage selection experience upon the camera processing a QR coded image displayed on the beverage dispenser. The graphical user interface at the mobile device may be configured for the user to transmit beverage selection commands over the network to the beverage dispenser 102 without having to touch the beverage dispenser 102. In some embodiments, the cups may also be automatically placed under a nozzle so that beverage fulfillment is entirely touch free or contactless. The contactless beverage fulfillment system allows a mobile device 102 to send beverage selection data including but not limited to individual beverage choices from those available at the beverage dispenser, pouring the beverage from the beverage dispenser, and stopping the pouring of the beverage. In some embodiments, the graphical user interface may include commands for mixing different beverages into a single cup during the same instance of beverage fulfillment.

In complement to the mobile devices and the beverage dispensers, a web server for completing instances of beverage fulfillment may include at least one processor connected to computerized memory storing web content and web server applications accessible over a network. In some non-limiting embodiments, the web server connects to the components of the system with application program interfaces (APIs) for web socket communication connections to the web server by a beverage dispenser, wherein the web server applications receive beverage data from the beverage dispenser for use in the instances of beverage fulfillment. The beverage data may include inventory data of beverages that are available at the dispenser or other information that is useful to consumers, such as consumer profiles for repeat customers. The beverage data includes a QR code generated by the beverage dispenser with beverage dispensing software stored on the beverage dispenser. The QR code includes a unique validation token to be stored on the web server for a respective instance of beverage fulfillment. At least one of the web server applications uses the beverage data from the beverage dispenser to update a graphical user interface distributed to remote mobile devices. In other embodiments, at least one of the web server applications receives beverage commands from the remote mobile devices and transmits the beverage commands to the beverage dispenser. The beverage commands may include, without limitation, selecting a beverage available at the beverage dispenser, pouring the beverage from the beverage dispenser, stopping the pouring of the beverage, and topping off the pouring of the beverage into a container.

Embodiments of this disclosure further include a web server 119 for completing instances of beverage fulfillment. The web server incorporates at least one web server processor connected to web based computerized memory storing web content and web server applications accessible over a network, such as but not limited to cloud based networks. Application program interfaces (APIs) for web socket communication connects the web server to a beverage dispenser, wherein the web server applications receive beverage data from the beverage dispenser for use in the instances of beverage fulfillment.

Figure 4:
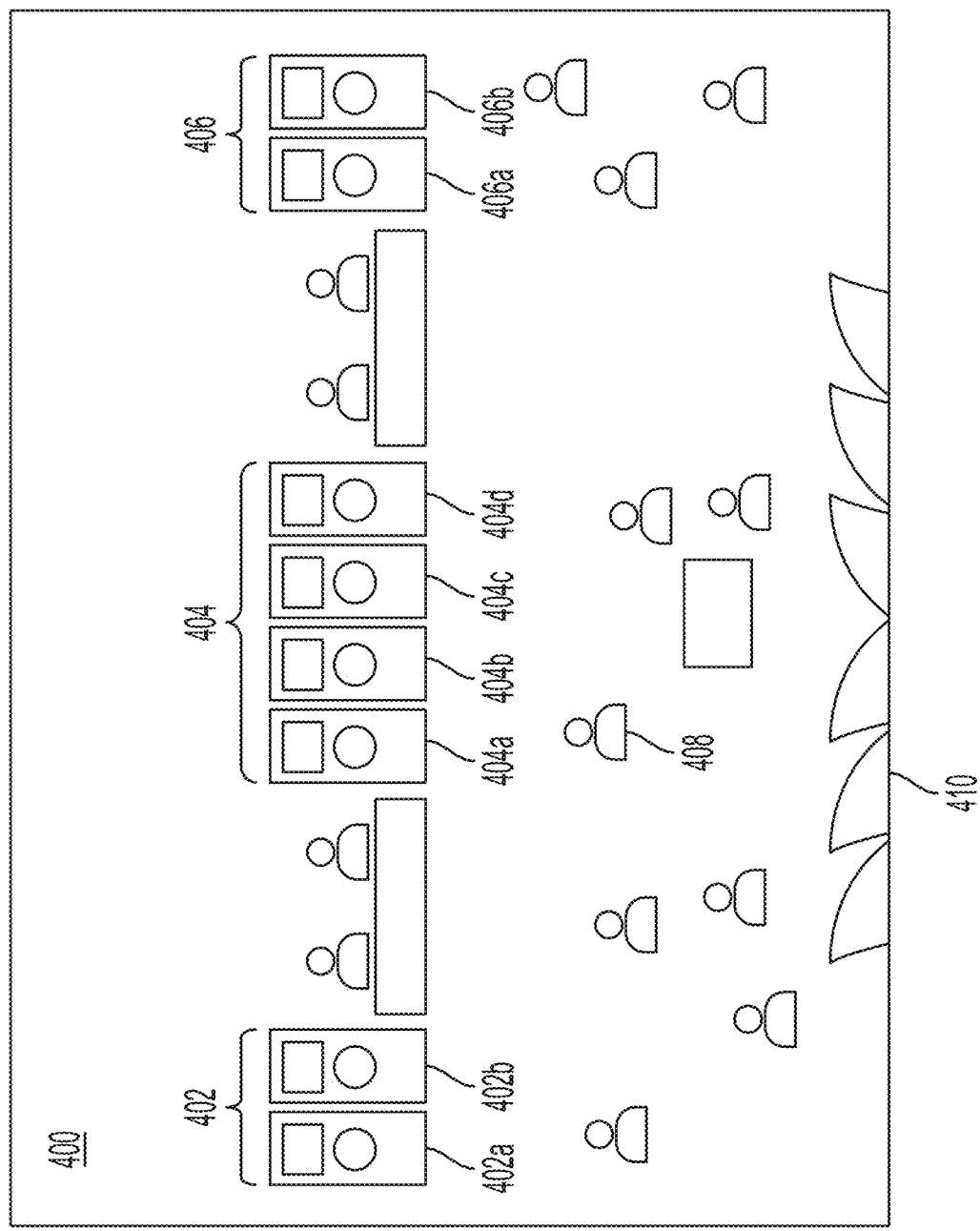
FIG. 4 illustrates an exemplary outlet with a plurality of beverage dispensers located therein according to various embodiments of the disclosure.

FIG. 4 illustrates an exemplary outlet 400 with a plurality of beverage dispensers located therein according to various embodiments of the disclosure. As shown, the outlet 400 includes a first bank 402 of beverage dispensers, a second bank 404 of beverage dispenser, and a third bank 406 of beverage dispensers. Each of the banks 402, 404, 406 of beverage dispensers includes one or more beverage dispensers. For example, bank 402 includes a beverage dispenser 402a and a beverage dispenser 402b. Likewise, the second bank 404 includes a beverage dispenser 404a, a beverage dispenser 404b, a beverage dispenser 404c, and a beverage dispenser 404d. Also, the third bank 406 includes a beverage dispenser 406a and a beverage dispenser 406b.

A consumer 408 may be one of many customers that enters the outlet 400 through an entrance 412. As previously discussed in other commonly owned patent applications, beverage dispensers may pre-arrange secure communications with customers' mobile devices upon a mobile device entering the outlet 400 or coming within a predetermined distance of the outlet 400, and a mobile device 122 carried by the consumer 408 may be determined to be within the first range of one or more beverage dispensers within the outlet 400. As a further example, upon entering a geofence location around or within a predetermined distance of the outlet 400, the mobile device 122 may be determined to be within the first range of one or more beverage dispensers within the outlet 400.

Figure 5:
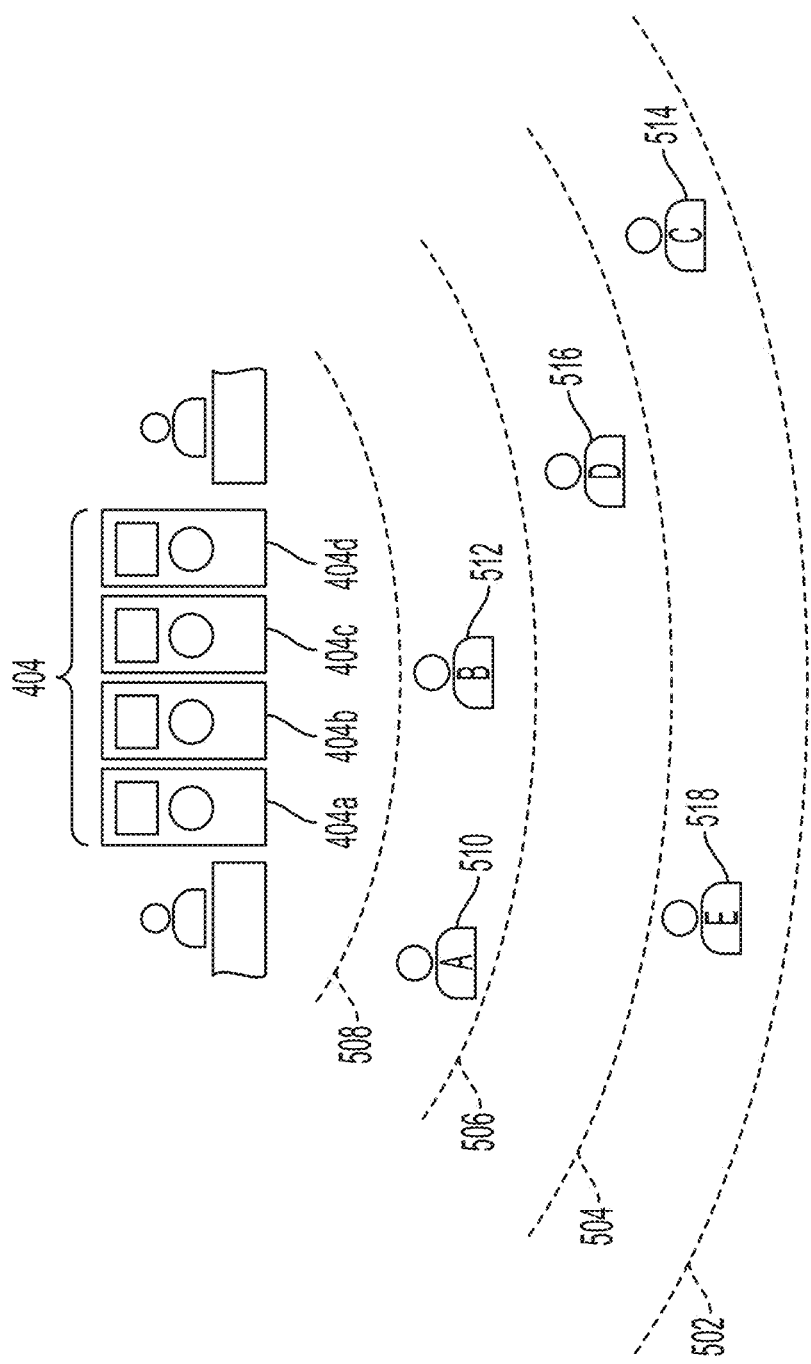
FIG. 5 illustrates a plurality of consumers at different ranges from a bank of beverage dispensers according to various embodiments of the disclosure.

FIG. 5 illustrates that technology surrounding communications between a beverage dispenser and mobile device may incorporate all of the protections of a "smart system" for validated communications. In the example of FIG. 5, a plurality of consumers at different positions around the second bank 404 of beverage dispensers 404a-404d according to various embodiments of the disclosure. As shown, consumers may be located at different ranges from the second bank 404 of beverage dispensers, including a first range 502, a second range 504, a third range 506, and a fourth range 508. The first range 502 may be located farthest away from the second bank 404 and the fourth range 508 may be located closest to the second bank 404. A first consumer 510 (consumer A) and a second consumer 512 (consumer B) may be located between the third range 506 and the fourth range 508. A fourth consumer 516 (consumer D) may be located between the second range 504 and the third range 506. A third consumer 514 (consumer C) and a fifth consumer 518 (consumer E) may be located between the first range 502 and the second range 504.

While shown for simplicity as distinct ranges from the second bank 404, each dispenser within the second bank 404 may have one or more wireless communication devices that establish distinct communication ranges for the respective dispenser. For example, the beverage dispenser 404a may have a wireless communication device that has a corresponding range within the fourth range 508 that encompasses the adjacent beverage dispenser 404b, but does not encompass the remaining beverage dispensers 404c, 404d in the second bank 404. Likewise, the beverage dispenser 404b may have a wireless communication device that has a corresponding range within the fourth range 508 that encompasses the adjacent beverage dispensers 404a, 404c, but does not encompass the remaining beverage dispenser 404d, and so on.

As the consumers move through the outlet, they may pass through one or more of the ranges 502-508. For example, the first consumer 510 may move to address the beverage dispenser 404a and the second consumer 512 may move to address the beverage dispenser 404c. At the same time, the third, fourth, and fifth consumers 514, 516, 518 may move to other parts of the outlet 400 and not address any of the beverage dispensers in the second bank 404.

Figure 6:
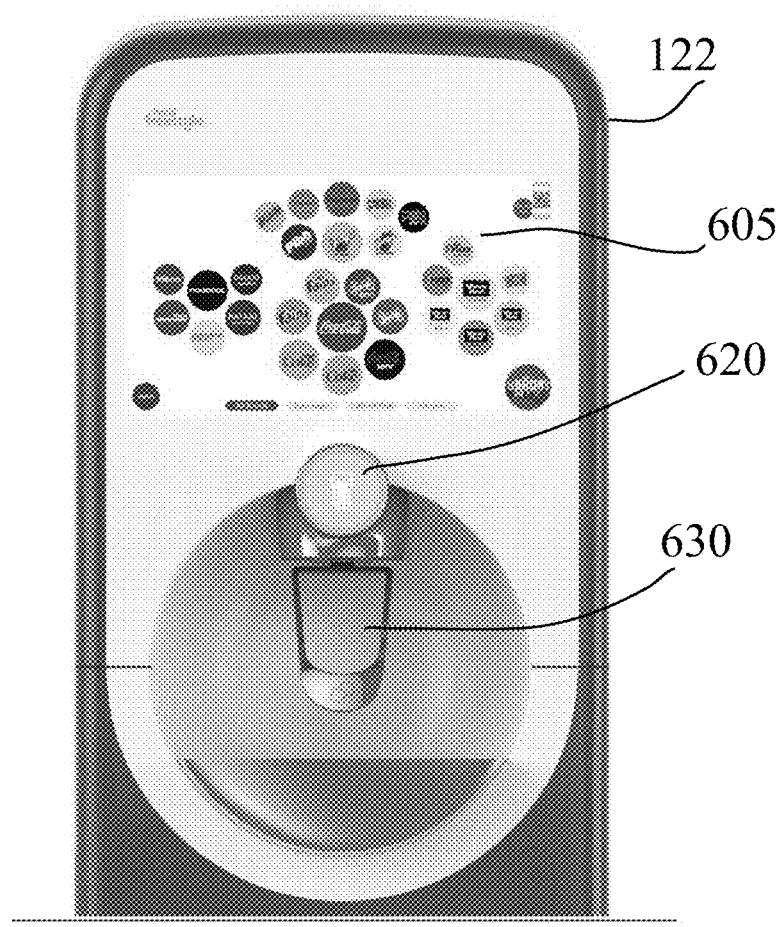
FIG. 6 illustrates exemplary graphical user interface screens on a mobile device for controlling a corresponding beverage dispenser and for navigating options on the beverage dispenser according to various embodiments of the disclosure.

FIG. 6 illustrates exemplary graphical user interfaces 605 and associated screens that may be implemented on a mobile device 122 for communicating beverage fulfillment commands to the beverage dispenser 102 and for navigating a beverage dispenser operation 102 according to various embodiments of the disclosure. Following the example in FIG. 5 above, the graphical user interface screens shown in FIG. 6 may correspond to the user interface 104 of the beverage dispenser 102.

As shown, a main screen 602 may present a graphical user interface 605 with a plurality of buttons 603 for making a beverage selection. For example, one or more of the buttons 603 on the main screen 602 are for navigating to sub-screens with different categories of beverages. These buttons may correspond to buttons that would be visible on a beverage dispenser 102 such as described in commonly owned U.S. patent application Ser. No. 14/485,826, entitled "Product Categorization User Interface for a Dispensing Device," which is herein incorporated by reference in its entirety. The main screen 602 also includes a pour button 620 to control a length of a pour operation for a selected beverage on the beverage dispenser 102. Another ice button 630 may be available for manually operating an ice dispenser function on a beverage dispenser 102.

Figure 7:
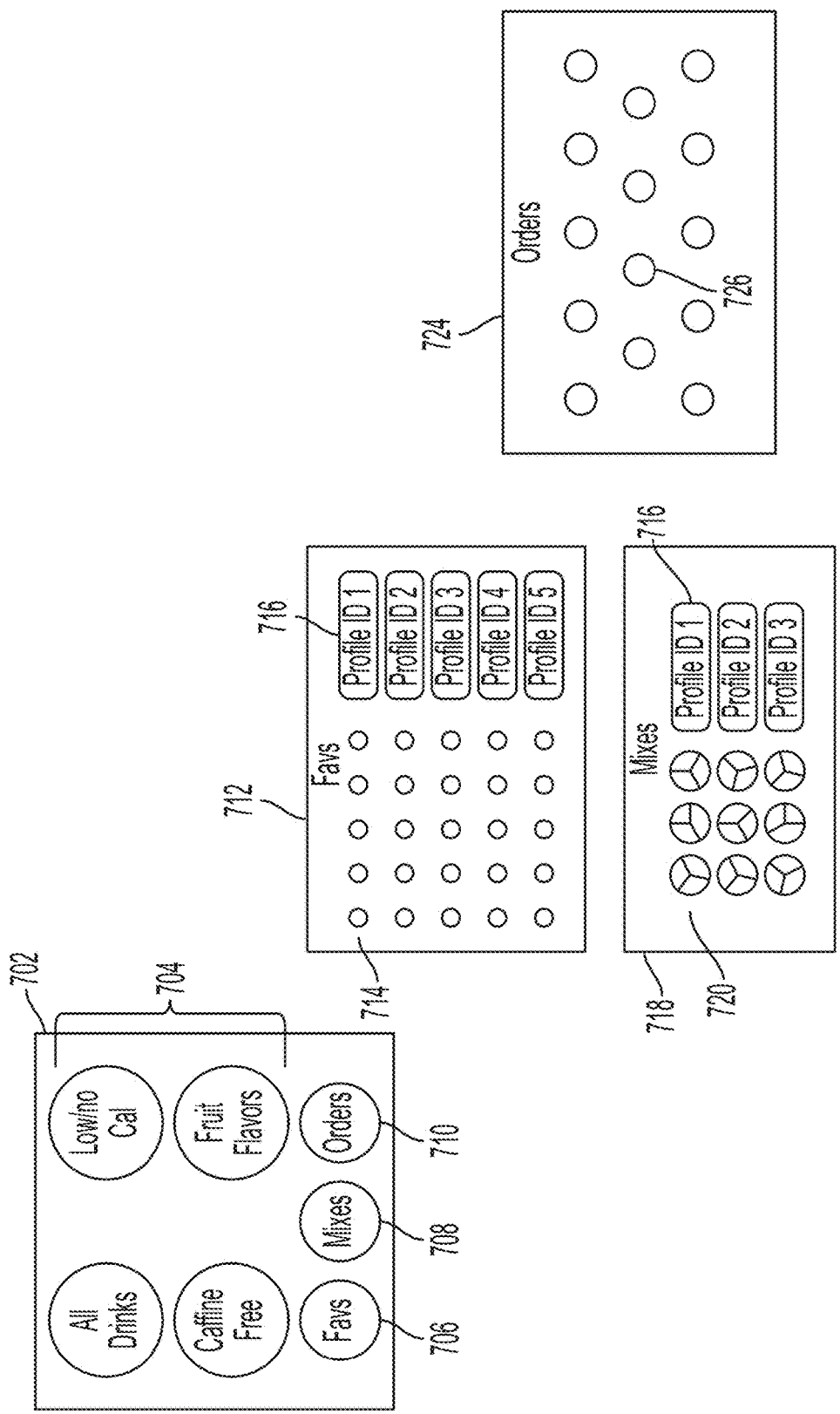
FIG. 7 illustrates exemplary graphical user interface screens on a beverage dispenser for navigating to selected beverages associated with a beverage dispenser according to various embodiments of the disclosure.

FIG. 7 illustrates exemplary graphical user interface screens on a beverage dispenser for navigating to previously selected beverages associated with a plurality of pre-loaded consumer profiles according to various embodiments of the disclosure. Following the example in FIG. 6 above, the graphical user interface screens shown in FIG. 7 may be displayed on the user interface 104 of the beverage dispenser 102 and on a graphical user interface 600 on a mobile device 122 controlling the beverage dispenser.

The details of the user interface 104 on the beverage dispenser 102 may be configured for operation on the dispenser but also configured to be replicated on a graphical user interface 600 on a mobile device 122. As shown on the beverage dispenser 102, a main screen 702 may present a graphical user interface with a plurality of buttons for making a beverage selection. For example, one or more of the buttons 704 on the main screen 702 are for navigating to sub-screens with different categories of beverages, such as described in U.S. patent application Ser. No. 14/485,826, entitled "Product Categorization User Interface for a Dispensing Device," noted above. The main screen 702 also includes one or more buttons of categories of pre-selected beverages maintained in user profiles. For example, the main screen 702 may include a selectable favorite beverages icon 706, a selectable mixes icon 708, and a selectable orders icon 710.

Upon selection of the mixes icon 708, a mixes screen 718 may be displayed on the user interface 104. The mixes screen 718 lists the top three mixes from each of a plurality of profiles, for example from each of the profiles in the profile queue or a predetermined number of profiles from an arrangement of profiles in the database of regional profiles. Other numbers of mixes from each profile may be shown in various implementations.

Figure 8:
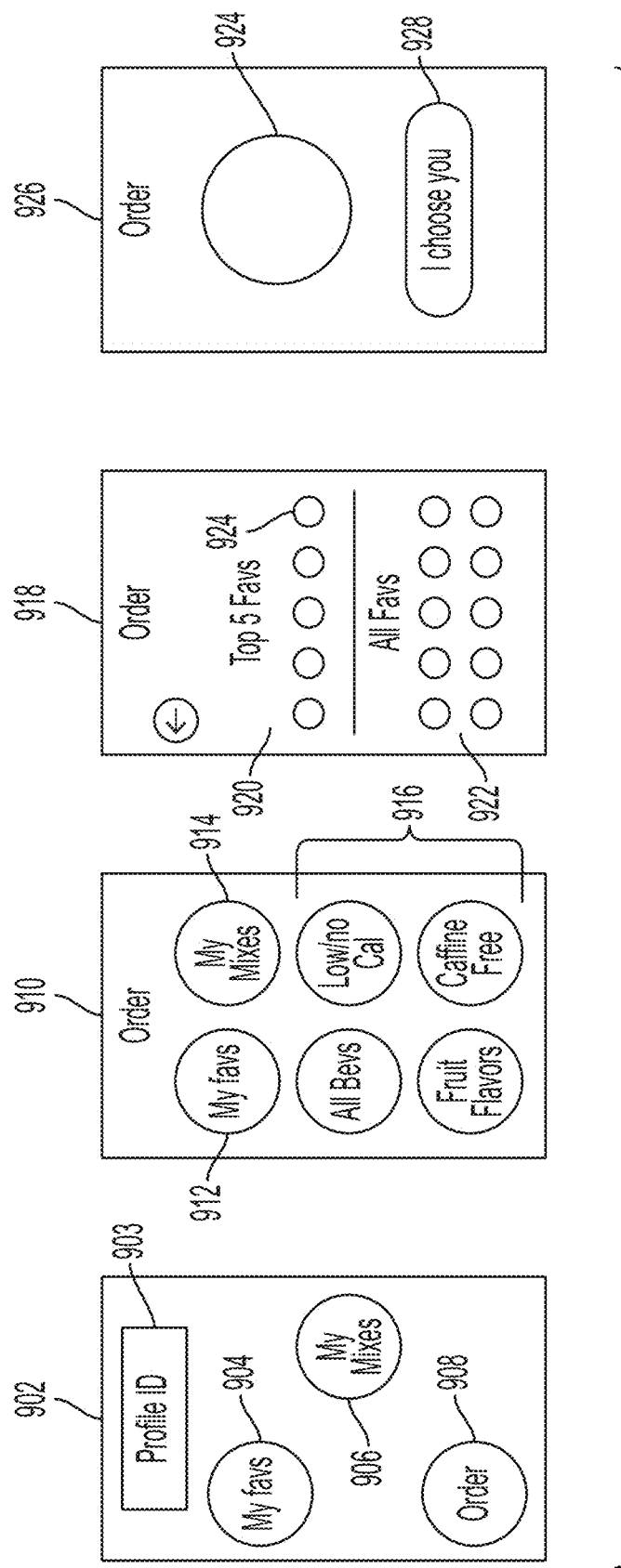
FIG. 8 illustrates an exemplary graphical user interface screen on a mobile device according to various embodiments of the disclosure.

FIG. 8 illustrates exemplary graphical user interface 600 and associated screens on the mobile device 122 for selecting and associating a beverage order with a beverage dispenser 102. Each of the graphical user interface screens shown in FIG. 8 may be displayed via a user interface on the mobile device 122, such as on a touchscreen display. A profile mobile application on the mobile device 122 facilitates customizing a consumer's profile that may be saved on a networked server or on a hard drive of the beverage dispenser. From the order screen 910, a plurality of beverage selection options may be presented. For example, one or more of the buttons 916 on the order screen 910 may be for navigating corresponding buttons on an associated beverage dispenser 102.

In response to selecting a beverage icon, an order verification screen 926 may be displayed on the user interface of the mobile device 122. For example, the order verification screen 926 may display the selected beverage icon 924 and include a selectable verification icon 928 ("I choose you") to verify their selection of the selected beverage icon 924 for their next order. Other variations and modifications of the order selection screens shown in FIG. 8 are contemplated by this disclosure. For example, one or more of the screens or icons may be omitted and other options not shown may be included.

Figure 9:
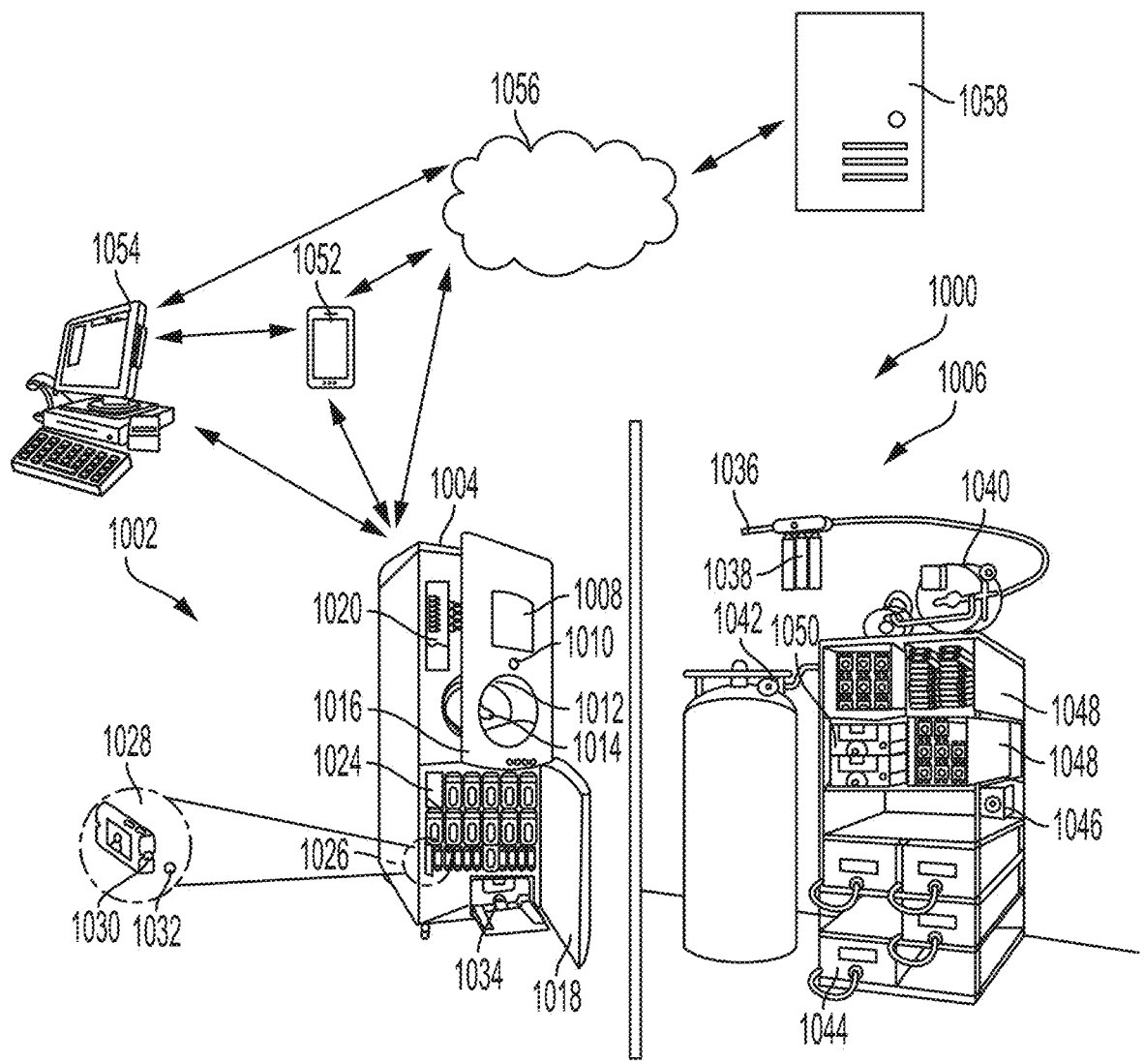
FIG. 9 illustrates an exemplary beverage dispenser system suitable for implementing the several embodiments of the disclosure.

FIG. 9 illustrates an exemplary beverage dispenser system 1000 suitable for implementing the several embodiments of the disclosure. As shown, the beverage dispenser system 1000 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 1000 includes a front room system 1002 with a beverage dispenser 1004 and a back room system 1006. The beverage dispenser 1004 includes a user interface 1008, such as a touchscreen display, to facilitate selection of the beverage to be dispensed. The user interface 1008 may employ various screens to facilitate user interactions on the beverage dispenser 1004 and/or receive a user profile through interaction with a user's mobile device 1052, such as described in commonly owned U.S. patent application Ser. No. 14/485,826, entitled "Product Categorization User Interface for a Dispensing Device," which is herein incorporated by reference in its entirety.

Figure 10:
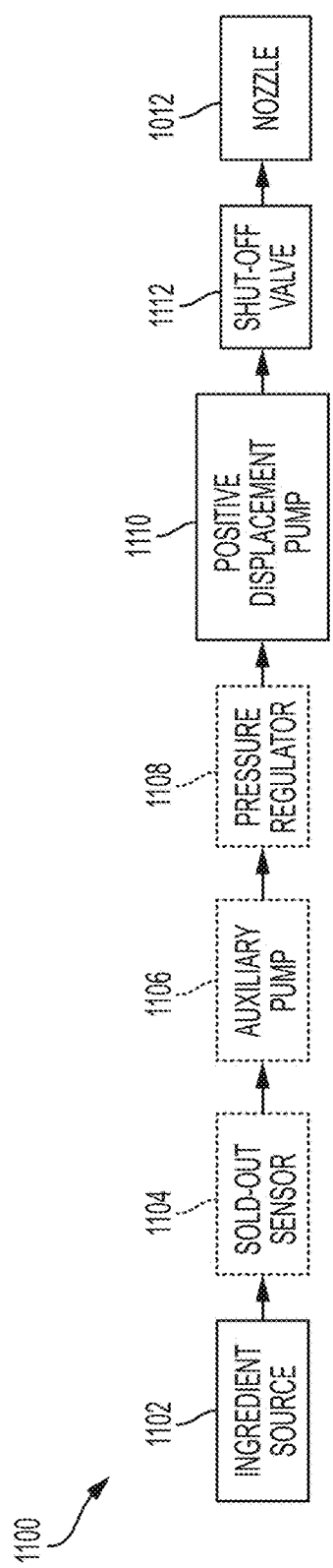
FIG. 10 illustrates an exemplary fluidic circuit with a positive displacement pump suitable for implementing the several embodiments of the disclosure.

Upon receiving a beverage selection via the user interface 1008, a pour button 1010 may be activated to dispense the selected beverage from the beverage dispenser 1004 via a nozzle 1014. For example, the pour button 1010 may be an electromechanical button, capacitive touch button, or other button selectable by a user to activate the beverage dispenser 1004 to dispense a beverage. While shown as a button, the pour button 1010 may alternatively be implemented as a lever or other mechanism for activating the beverage dispenser 1004 to dispense a beverage. As shown in FIG. 10, the pour button 1010 is separate from the user interface 1008. In some implementations, the pour button 1010 may be implemented as a selectable icon in the user interface 1008.

In some implementations, the beverage dispenser may also include an ice lever 1014. Upon being activated, the ice lever 1014 may cause the beverage dispenser 1004 to dispense ice through an ice chute (not shown). For beverage dispensers that do not have an ice bin, such as counter-electric or remote recirculation beverage dispensers, the ice lever 1014 may be omitted.

The beverage dispenser 1004 may be secured via a primary door 1016 and an ingredient door 1018. The primary door 1016 and the ingredient door 1018 may be secured via one or more locks. In some implementations, the locks are a lock and key. In some implementations, the lock on the ingredient door 1018 may be opened via an RFID reader (not shown) reading an authorize ingredient package 1028. The primary door 1016 may secure electronic components of the beverage dispenser 1004 including one or more controllers 1020. The ingredient door 1018 may secure an ingredient compartment that houses an ingredient matrix 1024.

The ingredient matrix 1024 includes a plurality of slots 1026 for receiving ingredient packages 1028. In various implementations, the ingredient packages 1028 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 9, there are three drawers of ingredients in the ingredient matrix 1024. One or more of the drawers may slide back and forth along a rail so as to periodically agitate the ingredients housed on the drawer. Other configurations of the ingredient matrix 1024 are possible, such as via one or more static and/or agitated ingredient towers.

Each ingredient package 1028 may comprise an RFID tag, a fitment 1030, and a fitment seal 1032. The fitment seal 1032 may be removed prior to installation into the beverage dispenser 1004. Upon installation, the fitment 1030 may engage with and provide a fluidic communication between a probe (not shown) in the slot 1026 and the ingredients contained in the ingredient package 1028. The ingredient matrix 1024 may also contain one or more large volume micro-ingredient packages 1034, such as for one or more micro-ingredient sweetener sources.

The beverage dispenser 1004 may also include a carbonator (not shown) for receiving water and carbon dioxide to produce carbonated water. The beverage dispenser 1004 may also include one or more heat exchangers (not shown), such as a cold plate, for cooling one or more of the beverage ingredients contained in or received by the beverage dispenser 1004. In some implementations, one or more of the micro-ingredients dispensed via the nozzle 1012 are not cooled via the heat exchanger or are otherwise maintained at an ambient temperature. Macro-ingredients dispensed via the nozzle 1012 are typically cooled via the heat exchanger prior to being dispensed.

The back room system 1006 is typically located in a back room remote from the front room system 1002, such as a storage area in a merchant location. The back room system 1006 includes a water source 1036 such as a municipal water supply that provides a pressurized source of plain water. The water received via the water source 1036 may be filtered or otherwise treated by a water treatment system 1038. The treated water may optionally be pressurized to a desired pressure with a water booster 1040 and supplied to the beverage dispenser. A carbon dioxide source 1042 may supply carbon dioxide to the beverage dispenser 1004.

One or more macro-ingredient sources 1044 may be located in the back room. The macro-ingredient from each macro-ingredient source 1044 may be supplied to the beverage dispenser 1004 via a pump 1046. The pump 1046 may be a controlled gear pump, diaphragm pump, BIB pump, or any other suitable pump for supplying macro-ingredients to the beverage dispenser 1004. The back room system 1006 may also include a rack with one or more storage locations 1048 for spare micro-ingredients and one or more storage locations 1050 for spare macro-ingredients.

The beverage dispenser 1004 may include one or more network interfaces for communicating directly with devices in the front room or the back room, communicating with devices in the front room or the back room in a local area network (LAN), or communicating with devices remote from a location with the beverage dispenser system 1000 via a wide area network (WAN) connection. For example, the beverage dispenser 1004 may include networking devices such as a near field communication (NFC) module, a BLUETOOTH module, a WiFi module, a cellular modem, an Ethernet module, and the like. The beverage dispenser 1004 may communicate via a direct communication or via a LAN with a user's mobile device 1052 or a point-of-sale (POS) device 1054 to receive a beverage selection or user profile of a user for configuring the beverage dispenser 1004 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 1004 may also communicate via a WAN 1056 for communicating with one or more remote servers 1058 to receive software updates, content updates, user profiles, or beverage selections made via the remote server 1058.

Figure 11:
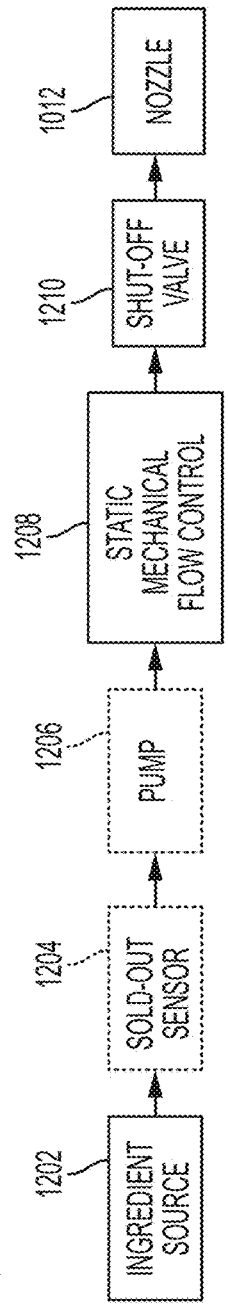
FIG. 11 illustrates an exemplary fluidic circuit with a static mechanical flow control suitable for implementing the several embodiments of the disclosure.
Figure 12:
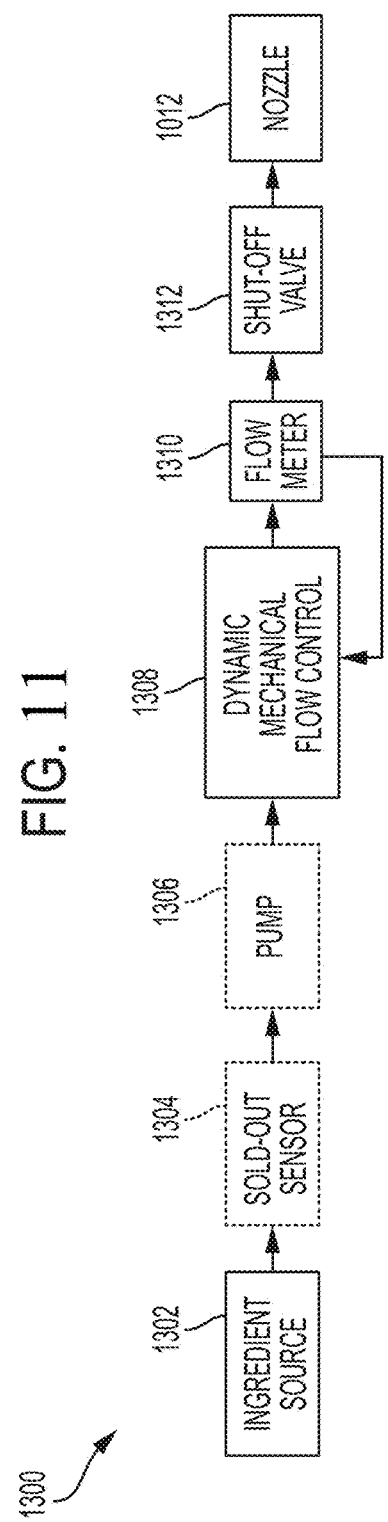
FIG. 12 illustrates an exemplary fluidic circuit with a dynamic mechanical flow control and flow meter suitable for implementing the several embodiments of the disclosure.

FIGS. 10-12 illustrate exemplary fluidic circuits 1100-1300 with pumping or metering devices from ingredient sources 1102, 1202, 1302 to the nozzle 1012 of the beverage dispenser 1004. The beverage dispenser 1004 may include none, one, or a plurality of the fluidic circuits shown in FIGS. 10-12. For each ingredient source, the beverage dispenser 1004 may include one of the fluidic circuits shown in FIGS. 10-12.

FIG. 10 illustrates an exemplary fluidic circuit 1100 with a positive displacement pump 1110 suitable for implementing the several embodiments of the disclosure. The fluidic circuit 1100 provides a fluid path from the ingredient source 1102 to the nozzle 1012. The ingredient source 1102 may be a micro-ingredient source or a macro-ingredient source housed in the ingredient matrix 1024 of the beverage dispenser 1004, remote from the beverage dispenser 1004 in the front room (e.g., adjacent to the beverage dispenser 1004 or under a counter on which the beverage dispenser 1004 is located), or located in the back room. The positive displacement pump 1110 may meter a predetermined volume or flow rate of ingredient from the ingredient source 1102 to the nozzle 1012. The positive displacement pump 1110 may be a piston pump, controlled gear pump, peristaltic pump, nutating pump, diaphragm pump, or other such positive displacement pump for metering a fixed volume of flow rate of a fluid with each cycle of the pump.

The fluidic circuit 1100 may optionally include a sold-out sensor 1104 for detecting when the ingredient source 1102 is empty. When the ingredient source 1102 is remotely located from the beverage dispenser 1004, the fluidic circuit 1100 may also optionally include an auxiliary pump 1106 for providing a pressurized supply of the beverage ingredient to the beverage dispenser 1004. Within or immediately adjacent to the beverage dispenser 1004, the fluidic circuit 1100 may include a pressure regulator 1108 such that the inlet of the positive displacement pump 1110 receives a lower or zero pressure supply of beverage ingredient. The fluidic circuit 1100 may also optionally include a shut-off valve 1112 that is configured to remain closed when an ingredient is not being dispensed so as to prevent beverage ingredient from dripping from the nozzle 1012.

FIG. 11 illustrates an exemplary fluidic circuit 1200 with a static mechanical flow control 1208 suitable for implementing the several embodiments of the disclosure. The static mechanical flow control 1208 receives a pressurized beverage ingredient from an ingredient source 1202 and provides a fixed flow rate of the beverage ingredient to the nozzle 1012. The static mechanical flow control 1208 may be calibrated with a set screw for configuring the flow rate of the static mechanical flow control 1208. A shut-off valve 1210 downstream of the static mechanical flow control 1208 may be actuated to open and close in order to dispense or prevent dispensing the beverage ingredient from the nozzle 1012.

The ingredient source 1202 may be a micro-ingredient source or a macro-ingredient source housed in the ingredient matrix 1024 of the beverage dispenser 1004, remote from the beverage dispenser 1004 in the front room (e.g., adjacent to the beverage dispenser 1004 or under a counter on which the beverage dispenser 1004 is located), or located in the back room. The ingredient source 1202 may also be the municipal water supply 1036 or other pressurized ingredient source. When the ingredient source 1202 is not pressurized, the fluidic circuit 1200 may include a pump 1206 for pressurizing the beverage ingredient from the ingredient source 1202. The pump 1206 may be any pump suitable for pressurizing the beverage ingredient from the ingredient source 1202, such as a BIB pump, $CO_2$ driven pump, controlled gear pump, or positive displacement pump. The fluidic circuit 1200 may also optionally include a sold-out sensor 1204 for detecting when the ingredient source 1202 is empty.

FIG. 12 illustrates an exemplary fluidic circuit 1300 with a dynamic mechanical flow control 1308, a flow meter 1310, and a shut-off valve 1312 suitable for implementing the several embodiments of the disclosure. The dynamic mechanical flow control 1308 receives a pressurized beverage ingredient from an ingredient source 1302 and provides an adjustable flow rate of the beverage ingredient to the nozzle 1012. The dynamic mechanical flow control 1308 may include a variable sized orifice that adjusts to dynamically change the flow rate of the beverage ingredient supplied to the nozzle 1012 based on control signals provided by the one or more controllers 1020. A flow meter 1310 downstream of the dynamic mechanical flow control 1308 measures a flow rate of the beverage ingredient being supplied by the dynamic mechanical flow control 1308 and provides a feedback loop to the dynamic mechanical flow control 1308 for controlling the variable sized orifice. A shut-off valve 1312 downstream of the dynamic mechanical flow control 1308 may be actuated to open and close in order to dispense or prevent dispensing the beverage ingredient from the nozzle 1012.

The ingredient source 1302 may be a micro-ingredient source or a macro-ingredient source housed in the ingredient matrix 1024 of the beverage dispenser 1004, remote from the beverage dispenser 1004 in the front room (e.g., adjacent to the beverage dispenser 1004 or under a counter on which the beverage dispenser 1004 is located), or located in the back room. The ingredient source 1302 may also be the municipal water supply 1036 or other pressurized ingredient source. When the ingredient source 1302 is not pressurized, the fluidic circuit 1300 may include a pump 1306 for pressurizing the beverage ingredient from the ingredient source 1302. The pump 1306 may be any pump suitable for pressurizing the beverage ingredient from the ingredient source 1302, such as a BIB pump, $CO_2$ driven pump, controlled gear pump, or positive displacement pump. The fluidic circuit 1300 may also optionally include a sold-out sensor 1304 for detecting when the ingredient source 1302 is empty.

While the components of the fluidic circuits 1100-1300 are shown in a particular order in FIGS. 10-12, any order of the components described above may be used. For example, the shut-off valve 1312 may be upstream of the flow meter 1310. Other variations are readily recognizable by those of ordinary skill in the art. Additionally, one or more heat exchangers (not shown) may be used at any location in the fluidic circuits of FIGS. 10-12. The heat exchanger may include an ice bin, water bath, cold plate, or remote recirculation system.

Figure 13:
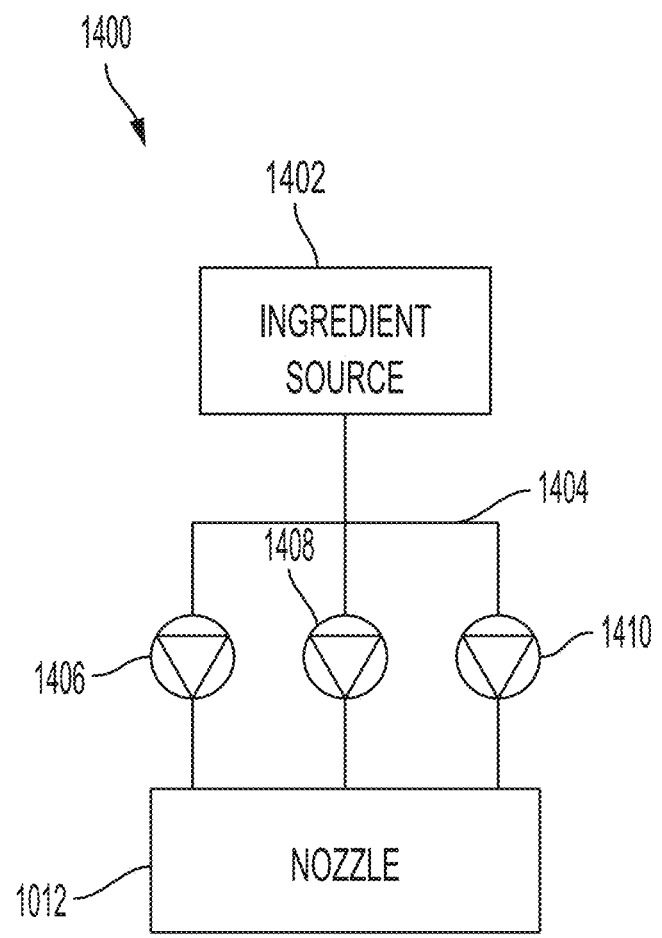
FIG. 13 illustrates an exemplary fluidic circuit with a plurality of independently controlled paths from a single ingredient source suitable for implementing the several embodiments of the disclosure.

FIG. 13 illustrates an exemplary fluidic circuit 1400 with a plurality of independently controlled paths from a single ingredient source 1402 to the nozzle 1012 suitable for implementing the several embodiments of the disclosure. The fluidic circuit 1400 includes a manifold 1404 for supplying beverage ingredient to each of the independently controlled paths. Each path includes a pumping or metering device 1406, 1408, 1410 for supplying beverage ingredient from the ingredient source 1402 to the nozzle 1012. The pumping or metering devices 1406, 1408, 1410 may be configured as any of the fluidic circuits 1100-1300 shown in FIGS. 11-13. By having multiple independent paths from the ingredient source 1402 to the nozzle 1012, a larger range of flow rates are possible than using any one of the pumping or metering devices 1406, 1408, 1410. For example, for a first flow rate of beverage ingredient from the ingredient source, only one of the pumping or metering devices 1406, 1408, 1410 may be activated. For a second flow rate of the beverage ingredient from the ingredient source, a plurality of the pumping or metering devices 1406, 1408, 1410 may be activated.

Figure 14:
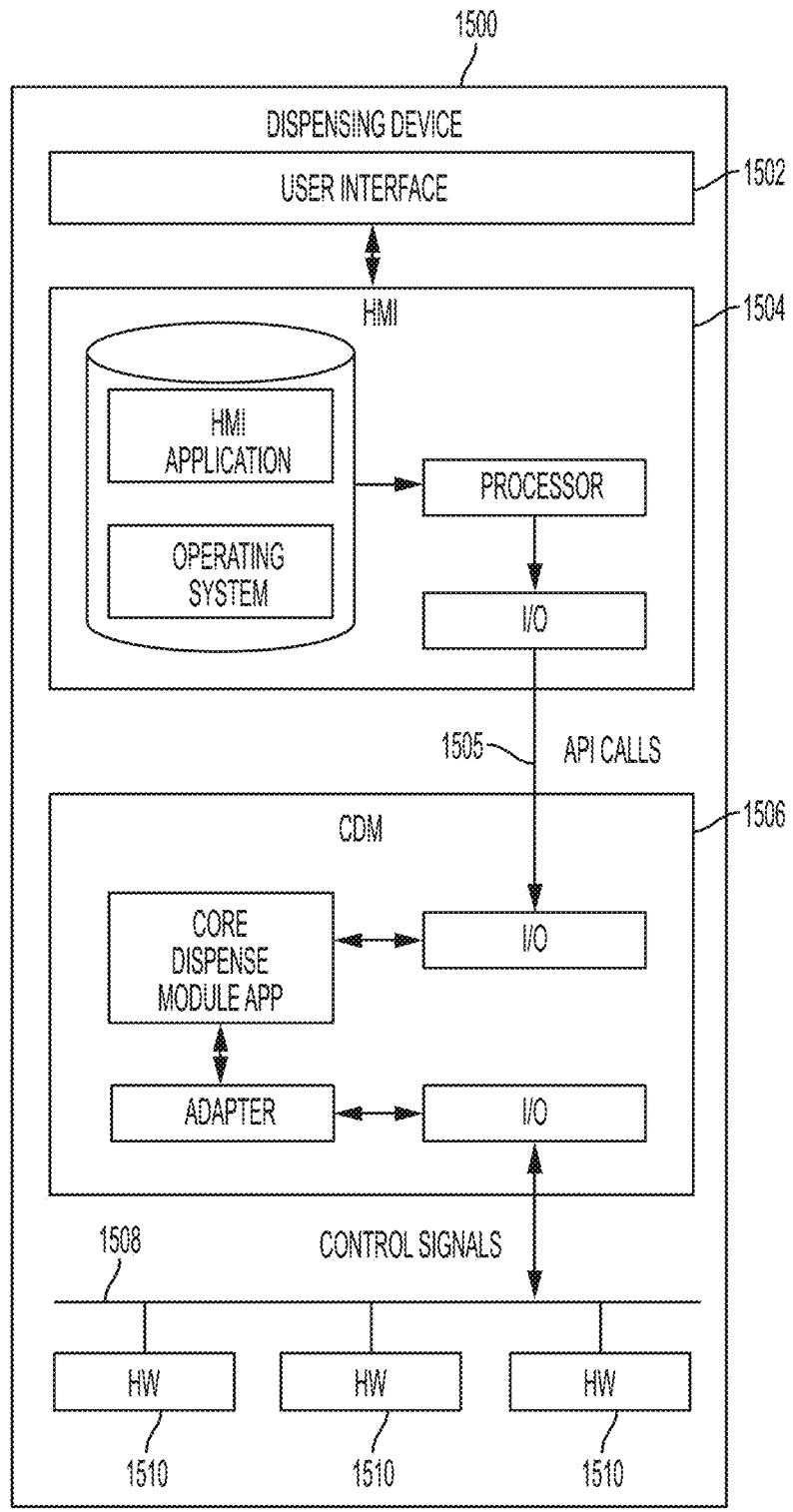
FIG. 14 illustrates an exemplary block diagram of a control architecture for a beverage dispenser suitable for implementing the several embodiments of the disclosure.

FIG. 14 illustrates an exemplary block diagram of a control architecture 1500 that may be used to control the beverage dispenser 1504 suitable for implementing the several embodiments of the disclosure. As shown in FIG. 14, control architecture 1500 may comprise a core dispense module (CDM) 1006, a human machine interface (HMI) module 1504, a user interface (UI) 1502, and a machine bus (MBUS) 1005. HMI 1504 may connect to or otherwise interface and communicate with at least one external device (e.g., mobile device 1052 or POS 1054) being external to beverage dispenser 1504. HMI 1504 may also control and update display screens on UI 1502. CDM 1506 may control flows from a plurality of pumps and/or valves 1510 in beverage dispenser 1504 according to a recipe to mix and dispense a product (e.g., a beverage) from beverage dispenser 1504.

Beverage ingredients (e.g., micro-ingredients, macro-ingredients, and/or diluents) may be combined to dispense various products that may include beverages or blended beverages (i.e., finished beverage products) from beverage dispenser 1504. However, beverage dispenser 1504 may also be configured to dispense beverage components individually.

An example of control architecture 1500 for beverage dispenser 1504 may be described in U.S. Ser. No. 61/987,020, entitled "Dispenser Control Architecture", filed on May 1, 2014, the entirety of which is hereby incorporated by reference. MBUS 1005 may facilitate communication between HMI 1504 and CDM 1506 via one or more API calls. HMI 1504, MBUS 1005, and CDM 1506 may collectively comprise common core components, implemented as hardware or as combination of hardware and software, which may be adapted to provide customized functionality in beverage dispenser 1504. Beverage dispenser 1504 may further include memory storage and a processor. Examples of UI 1502 may be described in U.S. Ser. No. 61/877,549, entitled "Product Categorization User Interface for a Dispensing Device", filed on Sep. 13, 2013, the entirety of which is hereby incorporated by reference.

UI 1502 may detect what area of a touch screen has been touched by a user (e.g., user 108). In response, UI 1502 may send HMI 1504 data regarding where the touch screen was touched. In response, HMI 1504 may interpret this received data to determine whether to have UI 1502 display a different UI screen or to issue a command to CDM 1506. For example, HMI 1504 may determine that the user touched a portion of the touch screen corresponding to a beverage brand. In response, HMI 1504 may issue a command to CDM 1506 to pour the corresponding beverage brand. In response to receiving the command to pour the corresponding beverage brand, the CDM 1506 in turn issues commands via one or more control buses 1508 to the pumping or metering devices 1510 for the beverage ingredients needed to dispense the beverage brand. Or HMI 1504 may determine that the user touched a portion of the touch screen corresponding to a request for another screen. In response, HMI 1504 may cause UI 1502 to display the requested screen.

In some embodiments, UI 1502 in beverage dispenser 1504 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1502 may be addressed via a number of methods to select and dispense beverages. For example, a user may interact with UI 1502 via touch input to navigate one or more menus from which to select and dispense a beverage. As another example, a user may type in a code using an onscreen or physical keyboard (not shown) on beverage dispenser 1504 to navigate one or more menus from which to select and dispense a beverage. As a further example, a user may interact with the HMI 1504 via a user interface of an application on the mobile device 1052.

UI 1502, which may include a touch screen and a touch screen controller, may be configured to receive various commands from a user (i.e., consumer input) in the form of touch input, generate a graphics output and/or execute one or more operations with beverage dispenser 1504 (e.g., via HMI 1504 and/or CDM 1506), in response to receiving the aforementioned commands A touch screen driver in HMI 1504 may be configured to receive the consumer or customer inputs and generate events (e.g., touch screen events) that may then be communicated through a controller to an operating system of HMI 1504.

Beverage dispenser 1504 may be in communication with one or more external device (e.g., mobile device 1052 or POS 1054). In some embodiments, the communication between beverage dispenser 1504 and the external device may be accomplished utilizing any number of communication techniques including, but not limited to, near-field wireless technology such as BLUETOOTH, Wi-Fi and other wireless or wireline communication standards or technologies, via a communication interface.

Figure 15:
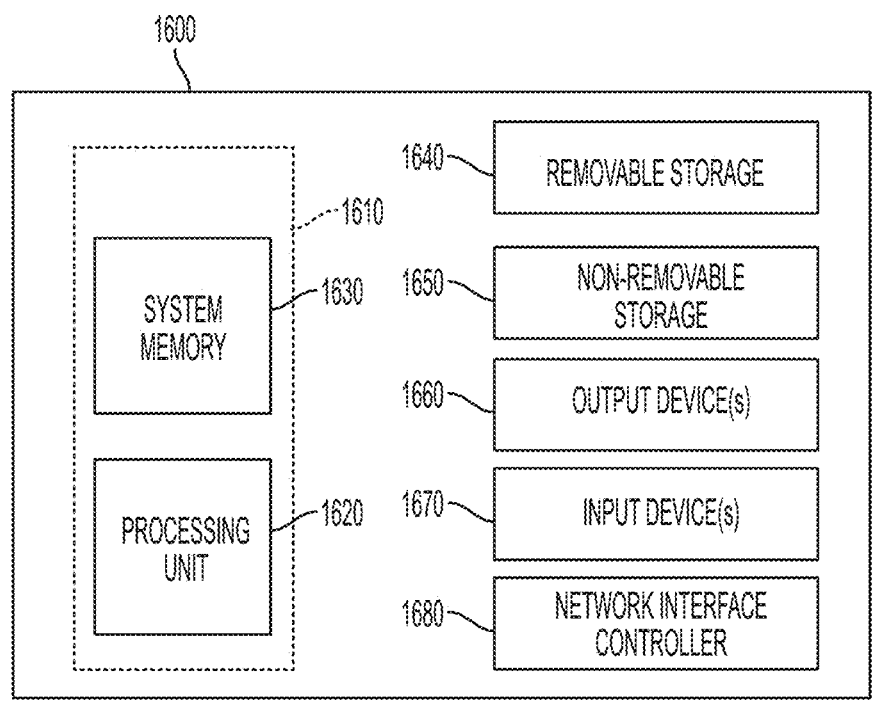
FIG. 15 illustrates an exemplary computer system suitable for implementing the several embodiments of the disclosure.

FIG. 15 illustrates an exemplary computer system 1600 suitable for implementing the several embodiments of the disclosure. For example, one or more components or controller components of the beverage dispenser 1504 may be implemented as the computer system 1600. In some implementations, one or both of the HMI 1504 and the CDM 1506 may be implemented as the computer system 1600.

It should be appreciated that the logical operations described herein with respect to the various figures may be implemented (1) as a sequence of computer implemented acts or program modules (i.e., software) running on a computing device (e.g., the computing device described in FIG. 16), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 15, an example computing device 1600 upon which embodiments of the invention may be implemented is illustrated. For example, each of the beverage dispenser 102, server 118, mobile device 122, POS device 124, beverage dispenser 1004, mobile device 1052, POS 1054, and the remote server 1058, described herein may each be implemented as a computing device, such as computing device 1600. It should be understood that the example computing device 1600 is only one example of a suitable computing environment upon which embodiments of the invention may be implemented. Optionally, the computing device 1600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 1600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 1600 to provide the functionality of a number of servers that is not directly bound to the number of computers in the computing device 1600. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 1600 typically includes at least one processing unit 1620 and system memory 1630. Depending on the exact configuration and type of computing device, system memory 1630 may be volatile (such as random access memory (RAM)), non-volatile (such as read-only memory (ROM), flash memory, etc.), or some combination of the two. This most basic configuration is illustrated in FIG. 16 by dashed line 1610. The processing unit 1620 may be a standard programmable processor that performs arithmetic and logic operations necessary for operation of the computing device 1600. While only one processing unit 1620 is shown, multiple processors may be present. Thus, while instructions may be discussed as executed by a processor, the instructions may be executed simultaneously, serially, or otherwise executed by one or multiple processors. The computing device 1600 may also include a bus or other communication mechanism for communicating information among various components of the computing device 1600.

Computing device 1600 may have additional features/functionality. For example, computing device 1600 may include additional storage such as removable storage 1640 and non-removable storage 1650 including, but not limited to, magnetic or optical disks or tapes. Computing device 1600 may also contain network connection(s) 1680 that allow the device to communicate with other devices such as over the communication pathways described herein. The network connection(s) 1680 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1600 may also have input device(s) 1670 such as a keyboard, keypads, switches, dials, mice, track balls, touch screens, voice recognizers, card readers, paper tape readers, or other well-known input devices. Output device(s) 1660 such as a printer, video monitors, liquid crystal displays (LCDs), touch screen displays, displays, speakers, etc. may also be included. The additional devices may be connected to the bus in order to facilitate communication of data among the components of the computing device 1600. All these devices are well known in the art and need not be discussed at length here.

The processing unit 1620 may be configured to execute program code encoded in tangible, computer-readable media. Tangible, computer-readable media refers to any media that is capable of providing data that causes the computing device 1600 (i.e., a machine) to operate in a particular fashion. Various computer-readable media may be utilized to provide instructions to the processing unit 1620 for execution. Example tangible, computer-readable media may include, but is not limited to, volatile media, non-volatile media, removable media, and non-removable media implemented in any method or technology for storage of information such as computer readable instructions, data structures, program modules or other data. System memory 1630, removable storage 1640, and non-removable storage 1650 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1620 may execute program code stored in the system memory 1630. For example, the bus may carry data to the system memory 1630, from which the processing unit 1620 receives and executes instructions. The data received by the system memory 1630 may optionally be stored on the removable storage 1640 or the non-removable storage 1650 before or after execution by the processing unit 1620.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A computerized system of beverage order fulfillment, the system comprising:
   a first computer connected in bi-directional electronic communication with at least one server over a network;
   a beverage dispenser comprising a processor and computerized memory storing beverage dispensing software thereon, the beverage dispenser in bi-directional electronic communication with the at least one server over the network during a respective instance of beverage fulfillment and further in bi-directional electronic communication with the first computer during the respective instance of beverage fulfillment;
   web browser software stored on the first computer, the web browser software configured to initiate communication sessions with the at least one server;
   an interactive graphical user interface (GUI) displayed on the first computer via the web browser, the interactive GUI configured and updated by communications from the at least one server; and
   data entry options displayed on the interactive GUI for the first computer to communicate beverage selection commands to the beverage dispensing software, via the at least one server, in the respective instance of beverage fulfillment.

2. The computerized system according to claim 1, further comprising web socket application program interfaces (APIs) stored on the at least one server and configured to connect to the beverage dispenser and the web browser software on the first computer.

3. The computerized system according to claim 1, further comprising encryption programs stored on the computerized memory of the beverage dispenser.

4. The computerized system according to claim 3, wherein the encryption programs are configured to create validation tokens for the respective instances of beverage fulfillment, the validation tokens confirming authenticity of electronic communications among the first computer, at least one server, and the beverage dispenser.

5. The computerized system according to claim 3, wherein the encryption programs are further configured to incorporate the validation tokens into a QR code displayed on the beverage dispenser via a beverage dispenser display, wherein the beverage dispenser communicates the token encoded by the QR code to the at least one server for use in the respective instance of beverage fulfillment.

6. The computerized system of claim 5, further comprising a busy icon displayed on the beverage instance display during the respective instance of beverage fulfillment.

7. The computerized system of claim 1, wherein the beverage dispenser further comprises a customer user interface and a non-customer user interface connecting the beverage dispenser display to the processor and the computerized memory of the beverage dispenser.

8. The computerized system of claim 1, wherein the first computer is a mobile device further comprising a camera and configured to initiate the web browser software and present the beverage selection experience upon the camera processing a QR coded image displayed on the beverage dispenser.

9. The computerized system of claim 8, wherein the image is a QR code comprising a validation token and a web address that initiates a website on the mobile device corresponding to the beverage fulfillment software on the beverage dispenser.

10. A computer implemented method of beverage fulfillment, the method comprising: establishing an instance of beverage fulfillment with electronic communications between a mobile device and a beverage dispenser, via a web server, by using respective computers to perform the following steps:
    using the mobile device, scanning a QR code displayed on the beverage dispenser to initiate the electronic communications among the mobile device, the web server, and the beverage dispenser during respective instances of beverage fulfillment;
    connecting the mobile device to a web address at the web server, wherein the web address is embedded within the QR code;
    receiving at the mobile device, from the web server, an interactive graphical user interface (GUI) corresponding to beverage options available at the beverage dispenser;
    using the interactive graphical user interface to transmit beverage commands to the web address; and
    using the web server to implement the beverage commands with beverage dispensing software stored on the beverage dispenser.

11. The computer implemented method of claim 10, further comprising:
    using the beverage dispensing software, creating the QR code and a unique validation token that proves authenticity of information used during the instance of beverage fulfillment;
    embedding the unique validation token and the website address in the QR code; and
    transmitting and storing the QR code, with the unique validation token and the website address embedded therein, at the web server; and
    displaying the QR code, with the unique validation token and the website address embedded therein, at the beverage dispenser.

12. The computer implemented method of claim 11, further comprising:

using a camera on the mobile device, processing an image of the QR code displayed at the beverage dispenser;
initiating an instance of beverage fulfillment with the QR code by connecting the mobile device to the website address embedded within the QR code.

13. The computer implemented method of claim 12, further comprising:
using the mobile device, extracting the unique validation token embedded within the QR code;
transmitting an extracted validation token from the mobile device to the web server;
using the web server, comparing the extracted validation token to the unique validation token to validate the electronic communications between the mobile device and the beverage dispenser;
using the web server to verify the authenticity of the token through a digital signature via HMAC hash-based message authentication code using a shared secret.

14. The computer implemented method of claim 10, further comprising using the graphical user interface at the mobile device to transmit beverage commands selected from the group consisting of selecting a beverage available at the beverage dispenser, pouring the beverage from the beverage dispenser, and stopping the pouring of the beverage.

15. A beverage dispenser, comprising:
a beverage dispenser display connected to a computer processor and computerized memory storing beverage dispensing software;
a nozzle configured to dispense a selected beverage;
a plurality of pumping and/or metering devices, each configured to supply beverage ingredients for the selected beverage from an ingredient source to the nozzle according to commands executed in the beverage dispensing software; and
a communications device configured to connect the beverage dispenser to a web server on a network and to receive beverage selection commands from the web server as the beverage selection commands are received from a mobile device.

16. The beverage dispenser of claim 15, further comprising encryption programs stored on the computerized memory of the beverage dispenser.

17. The beverage dispenser of claim 16, wherein the encryption programs are configured to create validation tokens for respective instances of beverage fulfillment, the validation tokens confirming authenticity of electronic communications and beverage selection commands from the web server.

18. The beverage dispenser of claim 17, wherein the encryption programs are further configured to incorporate the validation tokens into a QR code displayed on the beverage dispenser via a beverage dispenser display, wherein the beverage dispenser communicates the token and the QR code to the at least one server for use in the respective instance of beverage fulfillment.

19. The beverage dispenser of claim 18, further comprising a busy icon displayed on the beverage dispenser display during the respective instance of beverage fulfillment.

20. The beverage dispenser of claim 15, further comprising a customer user interface and a non-customer user interface connecting the beverage dispenser display to the processor and the computerized memory of the beverage dispenser.

* * * * *